United States Patent
Akiyama

(10) Patent No.: US 10,162,586 B2
(45) Date of Patent: Dec. 25, 2018

(54) ROLL PRINTING DEVICE, NON-TRANSITORY RECORDING MEDIUM STORING PROGRAM FOR CONTROLLING PRINTING ON ROLL OF PRINT MEDIA, AND METHOD FOR THE SAME

(71) Applicant: Konica Minolta, Inc., Tokyo (JP)

(72) Inventor: Shinichi Akiyama, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/805,697

(22) Filed: Nov. 7, 2017

(65) Prior Publication Data
US 2018/0129457 A1 May 10, 2018

(30) Foreign Application Priority Data

Nov. 9, 2016 (JP) .................................. 2016-218532

(51) Int. Cl.
*G06F 3/12* (2006.01)
*G03G 15/00* (2006.01)

(52) U.S. Cl.
CPC ............ *G06F 3/1251* (2013.01); *G03G 15/50* (2013.01); *G03G 15/6517* (2013.01); *G03G 15/6564* (2013.01); *G06F 3/126* (2013.01); *G06F 3/1208* (2013.01); *G06F 3/1219* (2013.01); *G06F 3/1282* (2013.01); *G06F 3/1262* (2013.01)

(58) Field of Classification Search
CPC .. G03G 15/50; G03G 15/6517; G06F 3/1251; G06F 3/1208; G06F 3/1219; G06F 3/126
See application file for complete search history.

(56) References Cited

U.S. PATENT DOCUMENTS

| | | | |
|---|---|---|---|
| 2011/0069329 A1 | 3/2011 | Abe et al. | |
| 2014/0153004 A1* | 6/2014 | Tufano | G06F 3/1205 358/1.2 |
| 2016/0231966 A1* | 8/2016 | Ujike | G06K 15/186 |
| 2016/0347085 A1* | 12/2016 | Cloots | B44C 5/04 |
| 2017/0357470 A1* | 12/2017 | Kouguchi | G03G 15/5087 |

FOREIGN PATENT DOCUMENTS

JP 2011/067960 A 4/2011

OTHER PUBLICATIONS

Translation of Abstract & figures of reference Akiyama et al. (JP Pub No. 2018-094,785 A); Pub date Jun. 21, 2018 (Year: 2018).*

* cited by examiner

*Primary Examiner* — Rodney A Bonnette
(74) *Attorney, Agent, or Firm* — Osha Liang LLP

(57) ABSTRACT

The roll printing device includes a hardware processor configured to, on receiving a succeeding job during printing of a preceding job on a roll of print media, use a printing area for printing copies of an object of the preceding job and the width of the print media, to determine a blank area or areas to be created on the print media, and judge whether to print the succeeding job together with the preceding job with copies of the object of the succeeding job being arranged in the blank area or areas. The hardware processor is further configured to, according to the judgment result, define the layout of the copies of the object of the succeeding job in the blank area or areas, and change image data currently used for printing, at a certain time during the printing of the preceding job.

23 Claims, 13 Drawing Sheets

| ON |
|---|
| OFF |

| ON |
|---|
| OFF |

| Suspend the printing |
|---|
| Suspend if a certain period is needed before the end of the printing |
| Continue the printing |

| Use the same layout |
|---|
| Use a new layout |

END OF PRECEDING JOB

END OF PRECEDING JOB

ROLL PRINTING DEVICE, NON-TRANSITORY RECORDING MEDIUM STORING PROGRAM FOR CONTROLLING PRINTING ON ROLL OF PRINT MEDIA, AND METHOD FOR THE SAME

CROSS-REFERENCE TO RELATED APPLICATIONS

The entire disclosure of Japanese Patent Application No. 2016-218532, filed on Nov. 9, 2016, is incorporated herein by reference in its entirety.

BACKGROUND

Technical Field

The disclosure relates to a roll printing device, a non-transitory recording medium storing a program for controlling printing on a roll of print media and a method for controlling printing on a roll of print media. In particular, the disclosure relates to a roll printing device configured to combine a preceding job and a succeeding job with each other to print these jobs together on a roll of print media, a non-transitory recording medium storing a computer-readable program for controlling printing on a roll of print media, to be executed in the roll printing device, and a method for controlling combining a preceding job and a succeeding job with each other to print these jobs together on a roll of print media.

Description of the Related Art

In processing of a job for printing an image onto continuous print media wound in a roll form (hereinafter, referred to as a roll of print media), final printed products may be given after various kinds of post processing, such as cutting a printed roll of print media at regular intervals, etc. In printing plural kinds of print jobs on sheets of print media, a printing device may print each of the print jobs separately on one or more sheets, so as to perform post processing easily. On the other hand, in the case of printing plural kinds of print jobs on a roll of print media with arranging objects of the print jobs in a mixed manner on the continuous print media, the print media needs to be cut at irregular intervals into sheets in post processing, which makes the post processing complicated. Accordingly, the control of printing objects of plural kinds of print jobs together on a roll of print media with a roll printing device might be difficult.

With respect to the control of a printing device which has received plural kinds of print jobs, for instance, Japanese Patent Application Laid-Open Publication (JP-A) No. 2011-067960, which corresponds to United States Patent Application Publication No. US2011/0069329A1, discloses the following image forming apparatus. The image forming apparatus includes: an image output unit that outputs images onto continuous paper; and an image data generator that performs a depict processing based on received print instructions to generate a plurality of image data sets. The image forming apparatus further includes: an image-layout determining unit that determines an image layout of the plurality of image data sets so as to print the image data sets based on at least two print instructions together on the continuous paper side by side; and an image combining unit that combines the plurality of image data sets generated by the image data generator, according to the image layout determined by the image-layout determining unit. The image forming apparatus further includes a controller that controls the image output unit so as to print out the plurality of image data sets combined by the image combining unit, onto the continuous paper.

When receiving plural jobs and then starting processing of the jobs, as a technique disclosed in JP-A No. 2011-067960, the roll printing device can process the jobs efficiently by determining an image layout of the jobs in consideration of post processing and then printing the plurality of image data sets combined together according to the determined image layout. On the other hand, when receiving a new job (hereinafter, referred to as a succeeding job) during processing of a previously-received job (hereinafter, referred to as a preceding job), the roll printing device may print objects of these jobs in a mixed manner on print media, but it makes post processing of the print media difficult. Therefore, the roll printing device may handle these jobs by starting processing of the succeeding job after the finish of the processing of the preceding job, or by suspending the processing of the preceding job and then starting processing of the succeeding job. However, it would be difficult for the roll printing device to process both jobs efficiently by using either of the ways of handling the jobs.

SUMMARY

Embodiments of the present invention are directed to roll printing devices, non-transitory recording media each storing a program for controlling printing on a roll of print media and methods for controlling printing on a roll of print media, which allow a roll printing device to, on receiving a succeeding job during printing of a preceding job, print the succeeding job without suspending the printing of the preceding job.

A roll printing device reflecting one aspect of the present invention is a roll printing device for printing a job on a roll of print media. The roll printing device comprises a raster-image processor that creates image data for printing copies of an object contained in a job. The roll printing device further comprises a hardware processor and a print engine. In response to receiving a succeeding job during printing of a preceding job by using the image data created from the preceding job, the hardware processor performs a judgment (i.e., determination) process. The judgment process includes using a printing area for copies of an object contained in the preceding job to be printed and the width of the print media, to determine a blank area or areas to be created on the print media, in which none of the copies of the object of the preceding job is printed, extending along one or both of edges of the print media facing each other in a width direction of the print media. The judgment process further includes using the width of each of the blank area or areas and the size of a printing area in the width direction for a copy of an object contained in the succeeding job, to make a judgment whether to print the succeeding job together with the preceding job with copies of the object of the succeeding job to be printed, being arranged in the blank area or areas. On judging (i.e., determining) to print the succeeding job together with the preceding job, the hardware processor defines a layout of the copies of the object of the succeeding job to be printed, in the blank area or areas, and according to the layout, changes image data currently used for printing, from the image data created from the preceding job to the image data created from the preceding job and the image data created from the succeeding job, at a certain time during the printing of the preceding job. The print engine uses the image data for printing, to print copies of an object or objects in the image data for printing, on the print media.

A non-transitory recording medium reflecting one aspect of the present invention stores a computer-readable program for controlling printing on a roll of print media, to be executed in a roll printing device for printing a job on a roll of print media. The program comprises instructions which, when executed by a hardware processor of the roll printing device, cause the roll printing device to perform the following operations. The operations comprise causing a raster-image processor of the roll printing device to create image data for printing copies of an object contained in a preceding job to be printed; and causing a print engine of the roll printing device to print the copies of the object of the preceding job on the print media, by using the image data created from the preceding job. The operations further comprise, in response to receiving a succeeding job during printing of the preceding job, causing the raster-image processor to create image data for printing copies of an object contained in the succeeding job to be printed, and performing a judgment process. The judgment process includes using a printing area for the copies of an object contained in the preceding job to be printed and the width of the print media, to determine a blank area or areas to be created on the print media, in which none of the copies of the object of the preceding job is printed, extending along one or both of edges of the print media facing each other in a width direction of the print media. The judgment process further includes using the width of each of the blank area or areas and the size of a printing area in the width direction for a copy of an object contained in the succeeding job, to make a judgment whether to print the succeeding job together with the preceding job with the copies of the object of the succeeding job to be printed, being arranged in the blank area or areas. The operations further comprise, on judging to print the succeeding job together with the preceding job, defining a layout of the copies of the object of the succeeding job to be printed, in the blank area or areas, and according to the layout, changing image data currently used for printing, from the image data created from the preceding job to the image data created from the preceding job and the image data created from the succeeding job, at a certain time during the printing of the preceding job. The operations further comprise causing the print engine to print the copies of the object of the preceding job and the copies of the object of the succeeding job on the print media, by using the image data for printing, which has been changed.

A method reflecting one aspect of the present invention is a method for controlling printing on a roll of print media in a printing system which includes a roll printing device for printing a job on a roll of print media. The method comprises causing a raster-image processor of the roll printing device to create image data for printing copies of an object contained a preceding job to be printed; and causing a print engine of the roll printing device to print the copies of the object of the preceding job on the print media, by using the image data created from the preceding job. The method further comprises, in response to receiving a succeeding job during printing of the preceding job, causing the raster-image processor to create image data for printing copies of an object contained in the succeeding job to be printed, and performing a judgment process by a hardware processor of the roll printing device. The judgment process includes using a printing area for the copies of an object contained in the preceding job to be printed and the width of the print media, to determine a blank area or areas to be created on the print media, in which none of the copies of the object of the preceding job is printed, extending along one or both of edges of the print media facing each other in a width direction of the print media. The judgment process further includes using the width of each of the blank area or areas and the size of a printing area in the width direction for a copy of an object contained in the succeeding job, to make a judgment whether to print the succeeding job together with the preceding job with the copies of the object of the succeeding job to be printed, being arranged in the blank area or areas. The method further comprises, on judging to print the succeeding job together with the preceding job, defining by the hardware processor a layout of the copies of the object of the succeeding job to be printed, in the blank area or areas, and according to the layout, changing by the hardware processor image data currently used for printing, from the image data created from the preceding job to the image data created from the preceding job and the image data created from the succeeding job, at a certain time during the printing of the preceding job. The method further comprises causing the print engine to print the copies of the object of the preceding job and the copies of the object of the succeeding job on the print media, by using the image data for printing, which has been changed.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Figure 1:
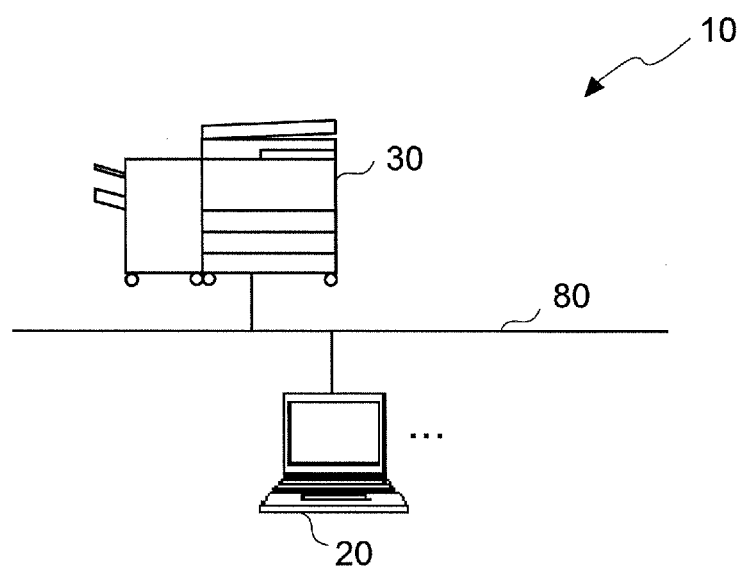
FIG. 1 is a schematic diagram illustrating a configuration of the disclosed printing system in accordance with Example 1.

Hereinafter, embodiments of the present invention will be described with reference to the drawings. However, the scope of the invention is not limited to the illustrated embodiments.

As described in the "BACKGROUND", in processing of a job for printing images onto a roll of print media, a roll printing device performs post processing, such as cutting the printed roll of print media at regular intervals. In the case of printing plural kinds of print jobs on a roll of print media with arranging objects of the print jobs in a mixed manner on the continuous print media, the print media needs to be cut at irregular intervals into sheets in the post processing, which makes the post processing difficult. Accordingly, the control of printing objects of plural kinds of print jobs together on a roll of print media with a roll printing device might be difficult.

Therefore, when receiving plural jobs and then starting processing of the jobs, the roll printing device may process the jobs by determining an image layout of the jobs in consideration of post processing and then printing the jobs according to the determined image layout. To make the post processing easier, when receiving a succeeding job during processing of a preceding job, the roll printing device may handle these jobs by starting processing of the succeeding job after the finish of the processing of the preceding job, or by suspending the processing of the preceding job and then starting processing of the succeeding job. However, it would be difficult for the roll printing device to process both jobs efficiently by using either of the ways of handling the jobs.

According to one or more embodiments, there is provided a roll printing device configured to, when receiving a job (a succeeding job) during printing of a previously-received job (a preceding job), determine a blank area or areas to be created on a roll of print media, in which none of the copies of the object of the preceding job is printed, extending along one or both of the edges of the print media; and when judging (i.e., determining) that the blank area or areas have an enough space to place copies of an object of the succeeding job to be printed, print the copies of the object of the succeeding job to be printed, with the copies being arranged in the blank area or areas on the print media (in other words, print the preceding job and the succeeding job in a combined manner, or combine the succeeding job with the preceding job). That is, the hardware processor of the roll printing device causes a raster-image processor of the roll printing device to create image data for printing copies of an object contained in a preceding job to be printed; and causes a printing unit (a print engine) of the roll printing device to print the copies of the object of the preceding job on the print media, by using the image data created from the preceding job. In response to receiving a succeeding job during printing of the preceding job, the hardware processor of the roll printing device performs the following operations. The hardware processor causes the raster-image processor to create image data for printing copies of an object contained in the succeeding job to be printed, and performs the following judgment (i.e., determination) process. In the judgment process, the hardware processor uses a printing area for copies of an object contained in the preceding job to be printed and the width of the print media, to determine a blank area or areas to be created on the print media, in which none of the copies of the object of the preceding job is printed, extending along one or both of edges of the print media facing each other in a width direction of the print media. In the judgment process, the hardware processor further uses the width of each of the blank area or areas and the width of a printing area in the width direction for copies of an object contained in the succeeding job, to make a judgment whether to print the succeeding job together with the preceding job with the copies of the object of the succeeding job to be printed, being arranged in the blank area or areas. On judging to print the succeeding job together with the preceding job, the hardware processor defines the layout of the copies of the object of the succeeding job to be printed, in the blank area or areas, and changes image data currently used for printing, according to the layout, from the image data created from the preceding job to the image data created from the preceding job and the image data created from the succeeding job, at a certain time during the printing of the preceding job. The hardware processor causes the printing unit (print engine) to print the copies of the object of the preceding job and the copies of the object of the succeeding job on the print media, by using the image data for printing, which has been changed.

In the judgment process, the hardware processor of the roll printing device may use the length of a printing area for a copy of the object of the preceding job in the machine direction of the print media and the number of the copies of the object of the preceding job to be printed (unprinted copies of the object of the preceding job), to calculate the length of a unprinted part of a printing area for the preceding job. Then, the hardware processor may further use the length of a printing area for a copy of the object of the succeeding job in the machine direction and the number of the copies of the object of the succeeding job to be printed, to calculate the length of a printing area for the succeeding job. The hardware processor may further make the judgment whether to print the succeeding job together with the preceding job, by using a result of comparison between the length of the unprinted part of the printing area for the preceding job and the length of the printing area for the succeeding job. Since the post processing starts at the end (the last-printed part) of the roll of print media, the hardware processor, if printing of the preceding job is estimated to be finished after the finish of printing of the succeeding job (when making a judgment that the length of the unprinted part of the printing area for the preceding job is not less than the length of the printing area for the succeeding job), may define the layout of the copies of the object of the succeeding job in the blank area or areas so as to line up the end of the unprinted part of the printing area for the preceding job and the end of the printing area for the succeeding job. Then, according to the layout, the hardware processor may change the image data currently used for printing, from the image data created from the preceding job to the image data created from the preceding job and the image data created from the successively job, at a time when the length of a current unprinted part of the printing area for the preceding job agrees with the length of the printing area for the succeeding job, during the printing of the preceding job.

On the other hand, if printing of the preceding job is estimated to be finished earlier than the finish of printing of the succeeding job (when making a judgment that the length of the unprinted part of the printing area for the preceding job is less than the length of the printing area for the succeeding job), the hardware processor may change the image data currently used for printing, from the image data created from the preceding job to the image data created from the preceding job and the image data created from the successively job, at a first time during the printing of the preceding job, and then change the image data currently used for printing, from the image data created from the preceding job and the image data created from the successively job to the image data created from the succeeding job, at a second time when the printing of the preceding job is finished. To keep the finish time of printing of the preceding job, the hardware processor may instruct the printing unit (print engine) to suspend printing at the second time when the printing of the preceding job is finished, and resume the printing by using only the image data created from the succeeding job, after the finish of the post processing of the preceding job. On judging that a time period necessary to finish the printing of the succeeding job after the second time (the time when the printing of the preceding job is finished) is shorter than a predetermined time period, the hardware processor may instruct the printing engine to continue the printing after the second time and stop the printing at or after the finish of the printing of the succeeding job; and on judging that a time period necessary to finish the printing of the succeeding job after the second time is not shorter than a predetermined time period, the hardware processor may instruct the printing unit (print engine) to suspend the printing at the second time.

In response to receiving a plurality of succeeding jobs during printing of the preceding job, the hardware processor of the roll printing device may choose, from the plurality of succeeding jobs, one or more jobs to be printed together with the preceding job with copies of the object contained in each of the one or more jobs to be printed, being arranged in the blank area or areas, and define the layout of the copies of the object of each of the one or more jobs to be printed, in the blank area or areas.

In a printing system according to one or more embodiments including a plurality of the roll printing devices communicably connected with each other, the hardware processor of one roll printing device may perform the following operations. In response to receiving a succeeding job during printing of a preceding job by using the image data created from the preceding job, the hardware processor of one roll printing device uses the printing area for the copies of the object of the preceding job currently processed by the roll printing device and the width of the print media loaded on the roll printing device, to determine the blank area or areas to be created on the print media loaded on the roll printing device. The hardware processor may obtain, from another (the second) roll printing device, information of a blank area or areas to be created on the print media loaded on another (the second) roll printing device, determined on the basis of a printing area for copies of an object contained in the preceding job currently processed by another (the second) roll printing device and the width of the print media loaded on another (the second) roll printing device. The hardware processor may compare the width of each of the blank area or areas to be created on the printed area loaded on each roll printing device, with the size of the printing area for a copy of the object contained in the succeeding job in the width direction, to choose one of the roll printing devices to be used for printing the succeeding job together with the preceding job currently processed with the copies of the object of the succeeding job to be printed, being arranged in the blank area or areas to be created on the printed area loaded on the one of the roll printing devices. Then, hardware processor may instruct the hardware processor of the one of the roll printing devices, to define the layout of the copies of the object of the succeeding job to be printed, in the blank area or areas, and change the image data currently used for printing, according to the layout, at a certain time during the printing of the preceding job currently processed by the one of the roll printing devices.

The control operations as described in the foregoing allow a roll printing device to print a succeeding job together with a preceding job without suspending printing of the preceding job, which makes the processing of a plurality of jobs efficient.

EXAMPLES

Example 1

Figure 3A:
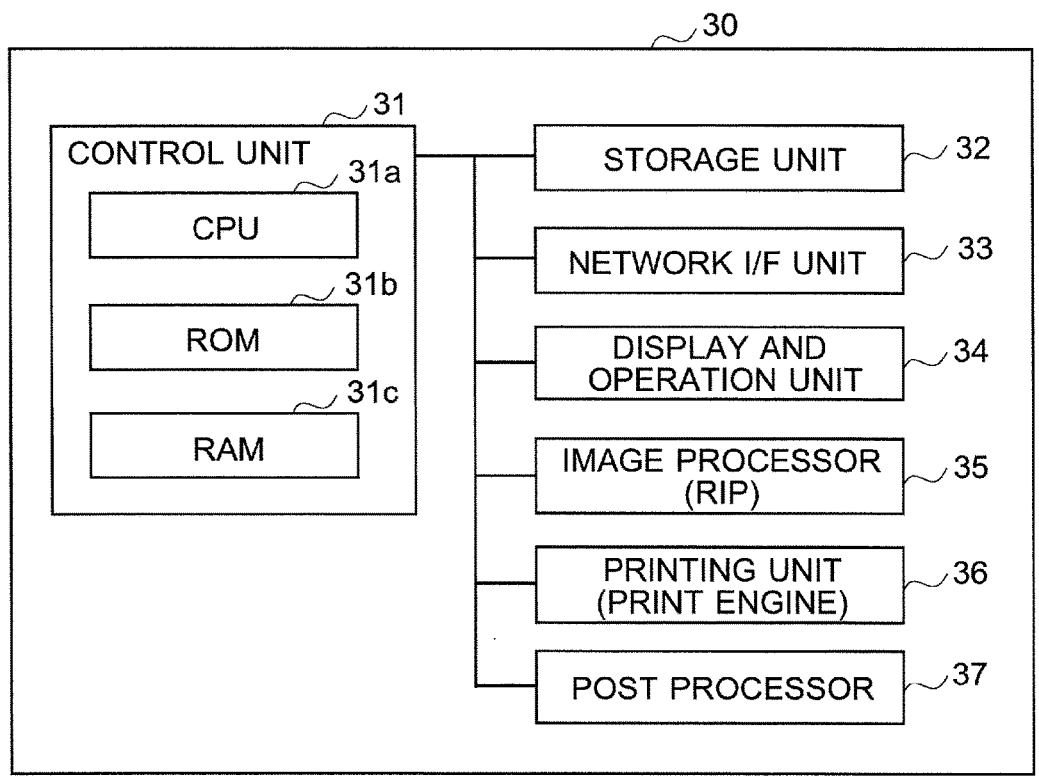
FIGS. 3A and 3B are block diagrams illustrating a configuration of the disclosed roll printing device in accordance with Example 1.
Figure 3B:
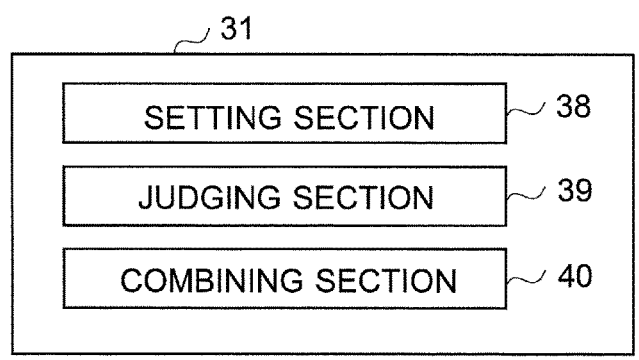
Figures 4A, 4B, 4C, 4D, 4E:
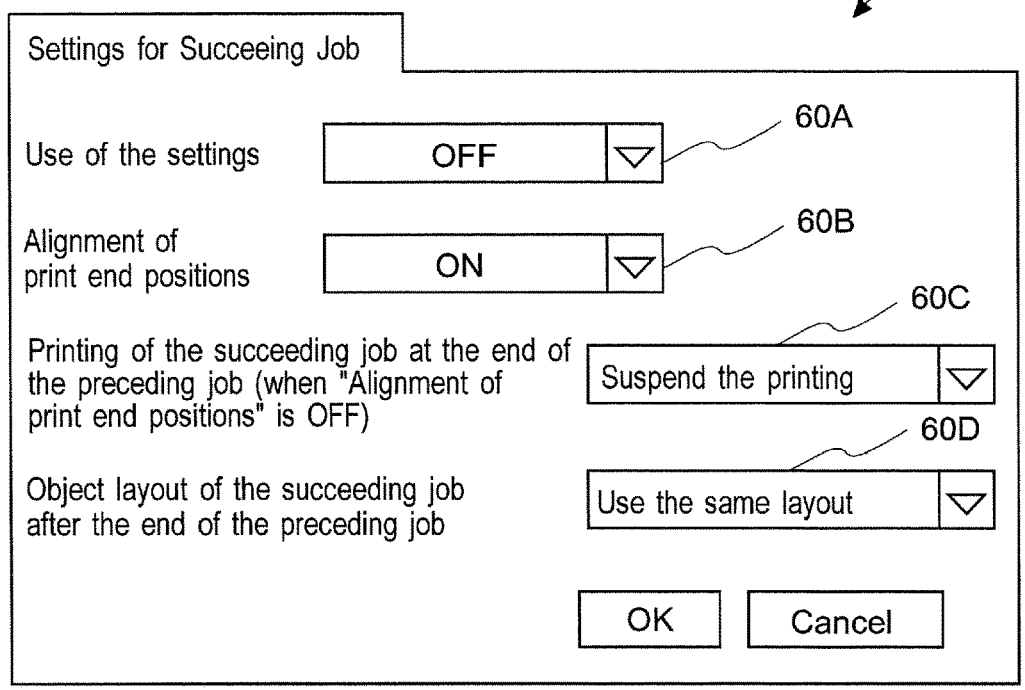
FIGS. 4A, 4B, 4C, 4D and 4E are schematic diagrams illustrating exemplary a setup screen for a succeeding job in accordance with Example 1.
Figure 5:
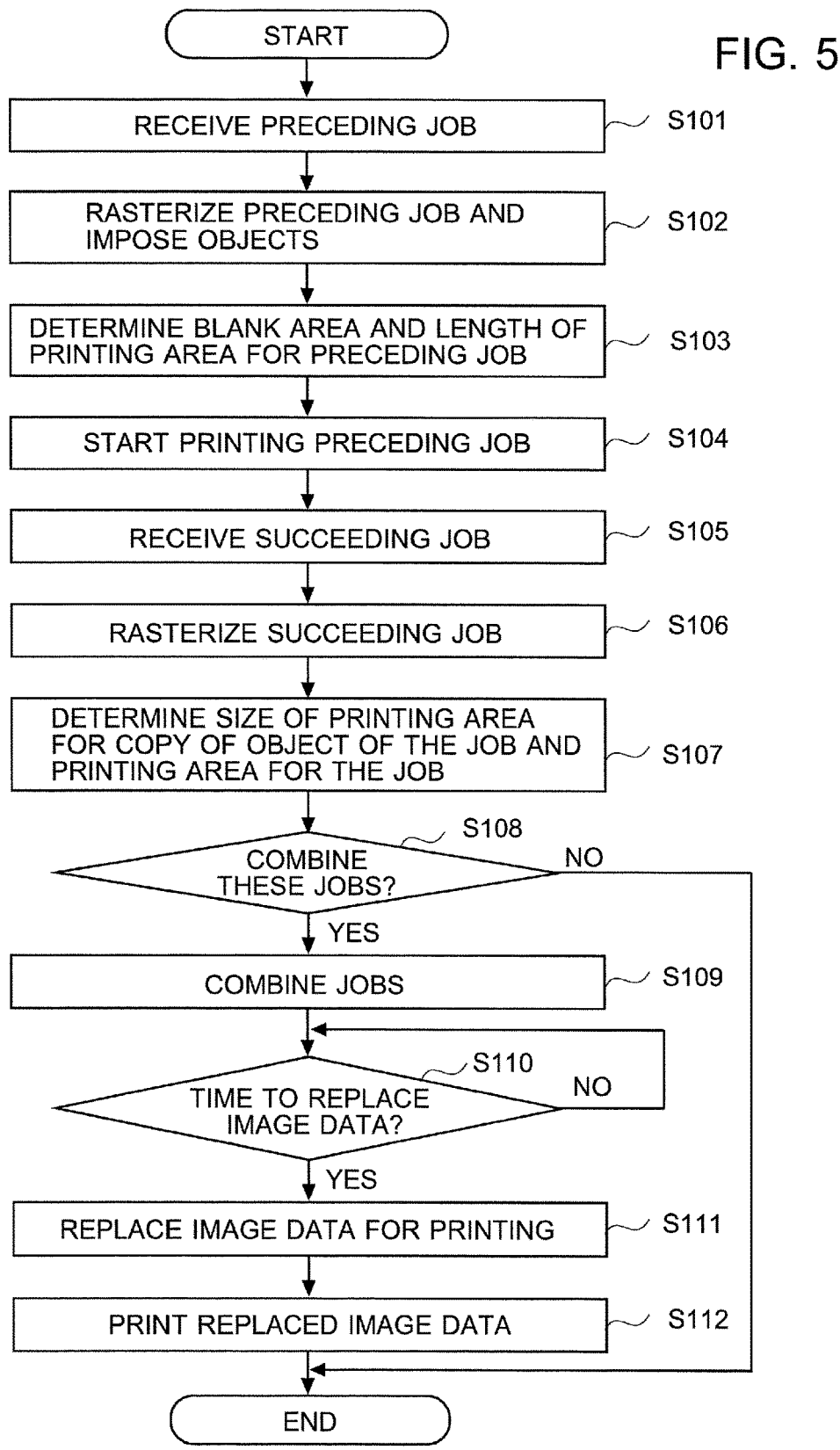
FIG. 5 is a flowchart illustrating a flow of the disclosed method for controlling printing on a roll of print media (operations of a roll printing device which has received a succeeding job during printing of a preceding job) in accordance with Example 1.

In order to describe the embodiments of the disclosure in detail, a description is given of a roll printing device, a non-transitory recording medium storing a computer-readable program for controlling printing on a roll of print media, and a method for controlling printing on a roll of print media, each in accordance with Example 1, with reference to FIGS. 1 through 11. FIG. 1 is a schematic diagram illustrating a configuration of the printing system in accordance with Example 1. FIGS. 2A and 2B are block diagrams illustrating a configuration of the client terminal. FIGS. 3A and 3B are block diagrams illustrating a configuration of the roll printing device. FIGS. 4A through 4E are schematic diagrams illustrating exemplary a setup screen for a succeeding job in accordance with Example 1. FIG. 5 is a flowchart illustrating a flow of the method for controlling printing on a roll of print media in accordance with Example 1. FIGS. 6 through 11 are schematic diagrams for illustrating various kinds of the layout of copies of an object of a job or copies of objects of plural jobs.

As illustrated in FIG. 1, printing system 10 of the present example includes at least one client terminal 20 configured to create a print job and send instructions to print the print job on a roll of print media, and roll printing device 30 configured to print on the roll of print media according to a print job. These devices are communicably connected to each other via communication network 80, where examples of the communication network 80 include a LAN (Local Area Network) conforming to a standard, for example, Ethernet, Token Ring, or FDDI (Fiber-Distributed Data Interface). Hereinafter, a concrete description of each device in the printing system 10 is given.

Figure 2A:
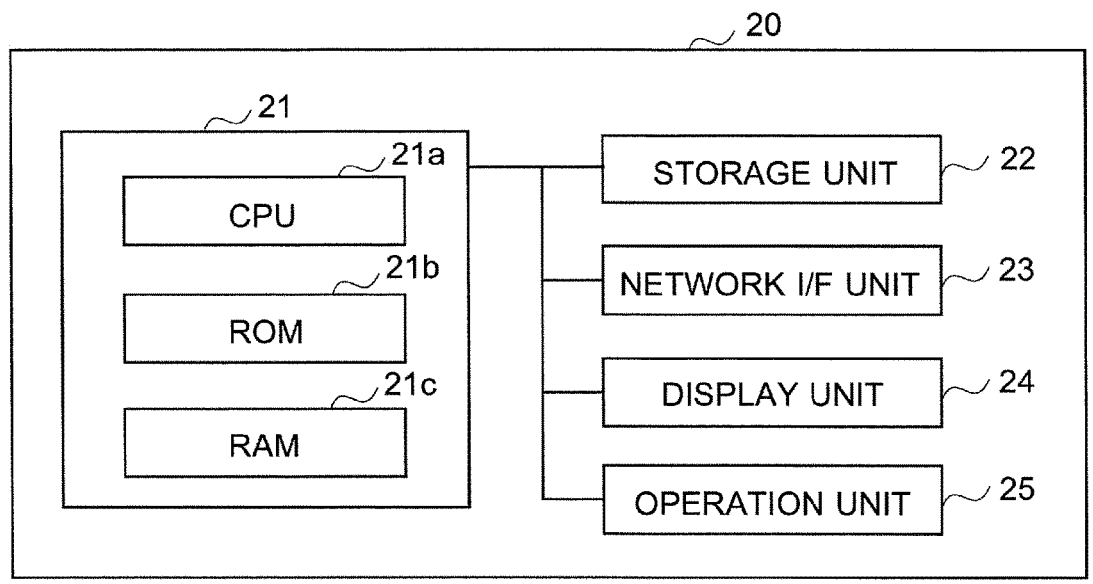
FIGS. 2A and 2B are block diagrams illustrating a configuration of the disclosed client terminal in accordance with Example 1.

Client Terminal:

Client terminals 20 includes, as illustrated in FIG. 2A, control unit 21, storage unit 22, network interface (I/F) unit 23, display unit 24 and operation unit 25.

Figure 2B:
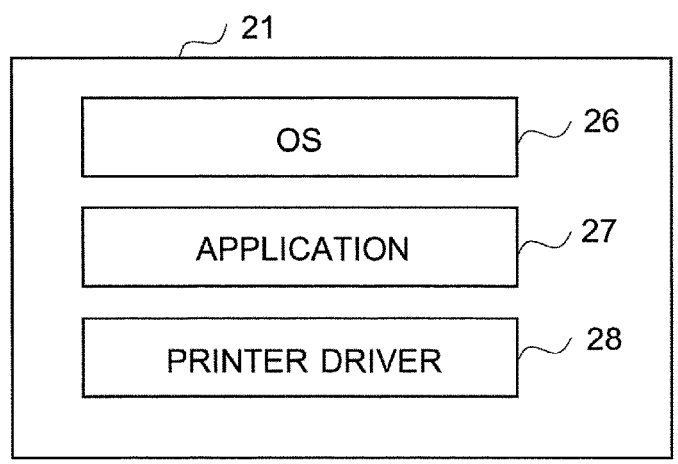

Control unit 21 includes CPU (Central Processing Unit) 21a and memories, such as ROM (Read Only Memory) 21b and RAM (Random Access Memory) 21c. CPU 21a includes a micro-processor, and is configured to, as illustrated in FIG. 2B, read control programs for controlling the overall operations of client terminal 20, OS (Operating System) 26, application programs 27 and printer driver 28 stored in ROM 21b or storage unit 22 to load the programs onto RAM 21c, and then execute the programs. Examples of OS 26 include Windows, macOS and Android, where Windows is a registered trademark of Microsoft Corporation in the United States and/or other countries, macOS is a trademark of Apple Inc. in the U.S. and other countries, and Android is a trademark of Google Inc. in the United States and/or other countries.

Printer driver 28 converts document data created by application program 27, into a print job written in a language that roll printing device 30 can interpret, where examples of the print job include PDL (Page Description Language) data written in page description languages, such as PJL (Printer Job Language), PS (PostScript) and PCL (Printer Control Language); and PDF (Portable Document Format) data. Printer driver 28 then sends the print job to roll printing device 30 to instruct the roll printing device 30 to print according to the print job.

Storage unit 22 includes a memory, such as a HDD (Hard Disk Drive), a SSD (Solid State Drive) or the like, which stores various programs, document data and print jobs and other data.

Network I/F unit 23 includes a NIC (Network Interface Card) and/or a modem. The network I/F unit 23 communicably connects client terminal 20 to communication network 80, so as to establish communication with roll printing device 30.

Display unit 24 includes a display like a LCD (Liquid Crystal Display) or an OEL (organic electroluminescence) display, and is configured to display various types of screens including a document creation screen of application 27 and a print setup screen of printer driver 28.

Operation unit 25 includes hardware devices, such as a mouse and a keyboard, and is configured to allow an operator to perform operations to create a document by using application program 27 and further allow an operator to perform operations relating to print instructions, which includes setting printing conditions, setting post processing conditions and print instructions, through printer driver 28.

Roll Printing Device:

As illustrated in FIG. 3A, roll printing device 30 includes control unit 31, storage unit 32, network interface (I/F) unit 33, display and operation unit 34, image processor 35, printing unit 36 and post processor 37. Incidentally, an image forming apparatus, such as an MFP (Multi-Functional Peripheral) or the like, may serve as the roll printing device 30.

Control unit 31 includes CPU 31a and memories, such as ROM 31b and RAM 31c. CPU 31a includes a micro-processor or the like, and is configured to read various programs stored in ROM 31b or storage unit 32 to load the programs onto RAM 31c and then execute the programs. The control unit 31 (CPU 31a) also serves as setting section 38, judging section 39 and combining section 40.

Setting section 38 is configured to cause display and operation unit 34 to display UI (user interface) through which an operator can input settings for a succeeding job, like the succeeding-job setup screen 60 illustrated in FIG. 4A. As illustrated in FIG. 4A, the succeeding-job setup screen 60 indicates "Use of the settings" section 60A, "Alignment of print end positions" section 60B, "Printing of the succeeding job at the end of the preceding job (when "Alignment of print end positions" is OFF)" section 60C and "Object layout of the succeeding job after the end of the preceding job" section 60D. The dropdown menu in the section 60A allows an operator to choose whether or not to use the settings for the succeeding job in the succeeding-job setup screen 60 ("ON" or "OFF") as illustrated in FIG. 4B. The dropdown menu in the section 60B allows an operator to choose whether or not to align or line up the end position of the printing area (the unprinted part) for the preceding job and the end position of the printing area for the succeeding job ("ON" or "OFF") as illustrated in FIG. 4C. The dropdown menu in the section 60C allows an operator to choose whether to suspend or continue the printing of the succeeding job at the finish of printing of the preceding job when "Alignment of print end positions" is OFF, that is, choose one of "Suspend the printing" at the finish of printing of the preceding job, "Suspend (the printing at the finish of printing of the preceding job) if a certain period is needed before the end of the printing" and "Continue the printing" after the finish of printing of the preceding job as illustrated in FIG. 4D. The dropdown menu in the section 60D allows an operator to choose the object layout of the succeeding job after the end of the preceding job, that is, whether to "Use the same layout" as that used in printing the preceding job and the succeeding job together or "Use a new layout" (for example, a layout such that copies of an object of the succeeding job are arranged in the whole part in the width direction of the print media) as illustrated in FIG. 4E.

Judging section 39 is configured to perform the following operations, when the control unit 31 receives a succeeding job created by the same or another client terminal 20, during printing of a previously-received or preceding job. Judging section 39 uses the size of an object contained in the preceding job to determine the printing area for copies of the object to be printed, and further use the printing area for the copies of the object of the preceding job and the width of the roll of print media to determine a blank area or areas to be created on the print media, where the blank area or areas are those in which none of copies of the object of the preceding job is printed and extend along one or both of the edges of the print media facing each other in the width direction of the print media. Judging section 39 then uses the width of each of the blank area or areas and the size (in the width direction of the print media) of a printing area for a copy of an object contained in the succeeding job, to make a judgment whether to print the succeeding job together with the preceding job with the copies of the object of the succeeding job being arranged in the blank area or areas (in other words, whether the succeeding job can be printed together with the preceding job in a combined manner, or whether the blank area or areas have enough space to arrange the copies of the object of the succeeding job to be printed). In the judgment, if needed, judging section 39 further performs the following operations. Judging section 39 uses the length (in the machine direction of the print media) of a printing area for a copy of the object of the preceding job and the number of copies of the object of the preceding job to be printed (the number of unprinted copies of the object of the preceding job), to calculate the length of a unprinted part of a printing area for the preceding job. Judging section 39 further uses the length (in the machine direction of the print media) of a printing area for a copy of the object of the succeeding job and the number of copies of the object of the succeeding job to be printed, to calculate the length of a printing area for the succeeding job. Judging section 39 further makes the judgment whether to print the succeeding job together with the preceding job with the copies of the object of the succeeding job being arranged in the blank area or areas (in other words, whether the succeeding job can be printed together with the preceding job in a combined manner, with the end of the unprinted part of the printing area for the preceding job and the end of the printing area for the preceding job being lined up), by using the setting chosen in the section 60B in the succeeding-job setup screen 60 ("Alignment of print end positions") and a result of comparison between the length of the unprinted part of the printing area for the preceding job and the length of the printing area for the succeeding job.

Combining section 40 is configured to perform the following operations, when judging section 39 has judged to print the succeeding job together with the preceding job. Combining section 40 defines the layout of the copies of the object of the succeeding job to be printed, in the blank area or areas. At a certain time during the printing of the preceding job, combining section 40 changes image data currently used for printing, according to the layout, from the image data created from the preceding job to the image data created from the preceding job and the image data created from the succeeding job, to send printing unit 36 print instructions based on the image data for printing (in other words, to print the succeeding job together with the preceding job in a combined manner, or combine the succeeding job together with the preceding job). For example, if the length of the unprinted part of the printing area for the preceding job is not less than the length of the printing area for the succeeding job (if the print end positions of the printing areas for the preceding job and the succeeding job can be lined up on the print media), combining section 40 defines the layout of the copies of the object of the succeeding job in the blank area or areas so as to line up the end of the unprinted part of the printing area for the preceding job and the end of the printing area for the succeeding job, according to the setting chosen in the section 60B in the succeeding-job setup screen 60 ("Alignment of print end positions"). At a time when the length of a current unprinted part of the printing area for the preceding job agrees with the length of the printing area for the succeeding job, during the printing of the preceding job, combining section 40 changes the image data currently used for printing, from the image data created from the preceding job to the image data created from the preceding job and the image data created from the successively job, to send printing unit 36 print instructions based on the image data for printing, which has been changed. On the other hand, if the length of the unprinted part of the printing area for the preceding job is less than the length of the printing area for the succeeding job (in other words, if the print end positions of the printing areas for the preceding job and the succeeding job cannot be lined up on the print media), combining section 40 changes the image data currently used for printing, from the image data created from the preceding job to the image data created from the preceding job and the image data created from the successively job, at a first time during the printing of the preceding job, and then changes the image data currently used for printing, from the image data created from the preceding job and the image data created from the successively job to the image data created from the succeeding job, at a second time when the printing of the preceding job is finished, to send printing unit 36 print instructions based on the image data for printing, which has been changed. In this process, according to the setting chosen in the section 60C in the succeeding-job setup screen 60 ("Printing of the succeeding job at the end of the preceding job (when "Alignment of print end positions" is OFF)"), combining section 40 may instruct printing unit 36 to suspend the printing at the time when the printing of the preceding job is finished, or may instruct printing unit 36, on judging that a time period necessary to finish the printing of the succeeding job after the time when the printing of the preceding job is finished is not shorter than a predetermined time period, to suspend the printing at the time when the printing of the preceding job has been finished (in other words, on judging that the time period is shorter than the predetermined time period, instructs the printing unit 36 to stop the printing after the finish of the printing of the succeeding job without suspending the printing at that time). When defining the layout of the copies of the object of the succeeding job to be printed, in the blank area or areas under the condition that the length of the unprinted part of the printing area for the preceding job is less than the length of the printing area for the succeeding job (if the print end positions of the printing areas for the preceding job and the succeeding job cannot be lined up on the print media), combining section 40 defines the layout of the copies of the object of the succeeding job to be printed, in the blank area or areas to be used after the end of printing of the preceding job, according to the setting chosen in the section 60D in the succeeding-job setup screen 60 ("Object layout of the succeeding job after the end of the preceding job"). For example, combining section 40 defines the layout by using the layout used in printing the succeeding job together with the preceding job (so as to arrange the copies of the object of the succeeding job to be printed, only in the blank area or areas) or using the layout different from that used in printing the succeeding job together with the preceding job (so as to arrange the copies of the object of the succeeding job to be printed, in the whole area of the print media).

The setting section 38, judging section 39 and combining 40 may be constituted as hardware devices. Alternatively, the setting section 38, judging section 39 and combining 40 (especially, judging section 39 and combining 40) may be provided by a program (a program for controlling printing on a roll of print media) which causes the control unit 31 to function as these sections when being executed by CPU 31a. That is, the control unit 31 may be configured to serve as the setting section 38, judging section 39 and combining 40, when CPU 31a executes the program.

Storage unit 32 includes a HDD and/or a SSD so as to store various programs, print jobs, image data and others.

Network interface unit 33 includes a NIC and/or a modem. The network interface unit 33 communicably connects roll printing device 30 to communication network 80, so as to establish communication with client terminal 20.

Display and operation unit 34 is configured to display various screens including a screen for operating roll printing device 30 and succeeding-job setup screen 60, and allows an operator to perform various setup operations and instruction operations on the screens. Examples of the display and operation unit 47 include a touch screen in which a pressure-sensitive operation unit (a touch sensor) composed of lattice-shaped transparent electrodes is arranged on a display unit.

Image processor 35 includes a raster-image processor (RIP). Image processor 35 is configured to analyze a print job, rasterize the print job to create image data for printing an object or copies of an object of the print job, perform image processing (color adjustment, density adjustment, size adjustment and other processing) and screening on the image data as needed, and then convert the image data into image data that can be printed by printing unit 36.

Printing unit (print engine) 36 includes components to be used for forming images according to an electrophotographic process or an electrostatic recording process, and is configured to print an object or copies of an object on a roll of print media by using image data for printing, which has been created by image processor 35, or image data for printing, which has been replaced by combing section 40. In concrete terms, in the printing unit 36, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a roll of print media (second transfer processing), and are fixed onto the print media by a fixing unit.

Post processor 37 is configured to use a roll of print media conveyed from printing unit 36 to perform post processing on the print media, such as cutting the print media into sheets, binding sheets of the print media and other processing, according to instructions given by control unit 31, and outputs finished print products.

It should be noted that FIGS. 3A and 3B illustrate roll printing device 30 of the present example for illustrative purpose only, and its constitution may be modified appropriately. For example, the roll printing device 30 disclosed in the present example includes image processor 35 so as to rasterize a print job received from client terminal 20, but a raster-image processor may be provided in a controller connected to communication network 80, in place of the image processor 35. The controller may be configured to receive a print job from client terminal 20, rasterize the print job to create image data, and send the created image data to roll printing device 30 (in other words, the controller may serve as setting section 38, judging section 39 and combining section 40).

Figure 6:
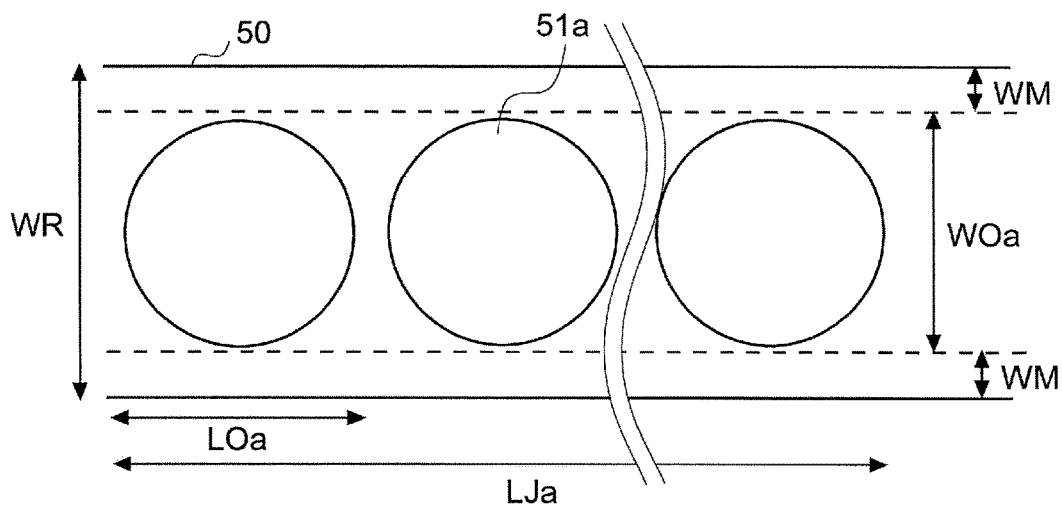
FIG. 6 is a schematic diagram illustrating a layout of copies of an object of a preceding job on a roll of print media in accordance with one or more embodiments.
Figure 7:
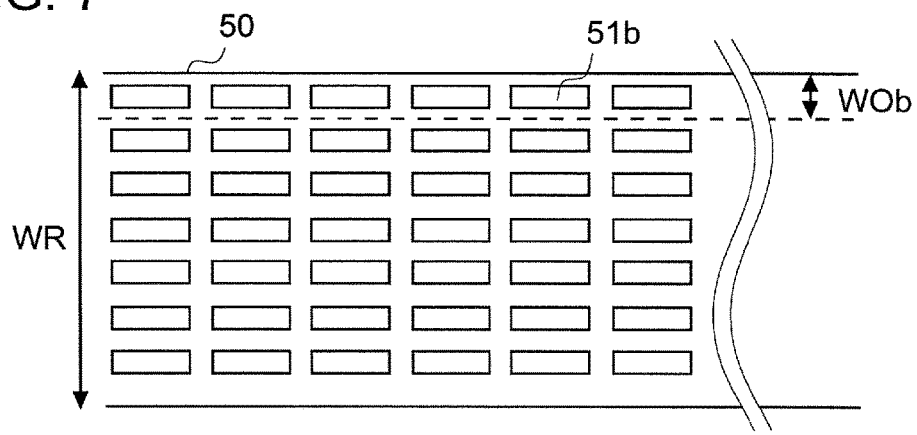
FIG. 7 is a schematic diagram illustrating a layout of copies of an object of only a succeeding job on a roll of print media in accordance with one or more embodiments.
Figure 8:
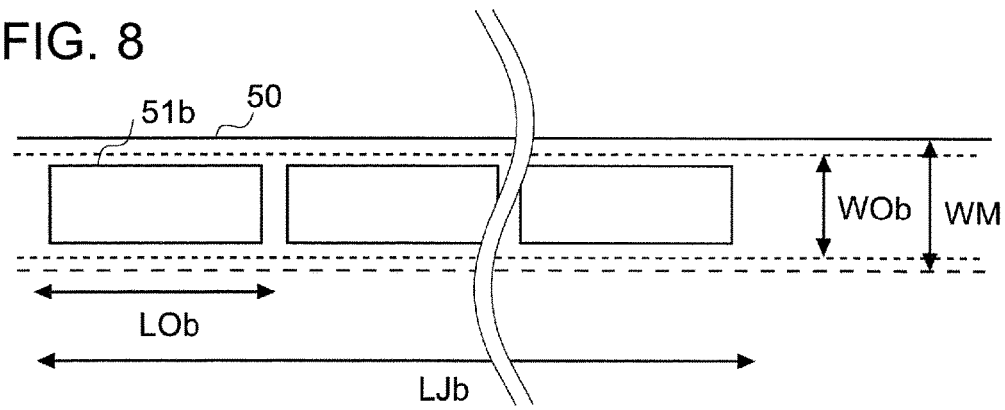
FIG. 8 is an enlarged schematic diagram illustrating a part of a layout of copies of an object of a succeeding job in accordance with one or more embodiments.

Referring to the flowchart indicated in FIG. 5 and the schematic diagrams illustrated in FIGS. 6 through 11, a description is given of the operations to be performed by the roll printing device 30 which has received a succeeding job during printing of a preceding job. FIG. 6 illustrates an example of a layout of copies of object 51*a* of a preceding job on a roll of print media. FIG. 7 illustrates an example of a layout of copies of only object 51*b* of a succeeding job on a roll of print media. FIG. 8 illustrates an example of a layout of copies of object 51*b* of a succeeding job in a blank area on a roll of print media. CPU 31*a* reads out a program for controlling printing on a roll of print media, stored in ROM 31*b* or storage unit 32, loads the program onto RAM 31*c*, and executes the program, thereby performing steps of the flowcharts illustrated in FIG. 5. The following description is given under the assumption that, in succeeding-job setup screen 60, "ON" is set in section 60A ("Use of the settings") and "ON" is set in section 60B ("Alignment of print end positions").

Initially, control unit 31 of roll printing device 30 receives a preceding job from client terminal 20 (Step S101). Then, according to instructions given by control unit 31, image processor 35 (the raster-image processor) rasterizes the received preceding job to create image data for printing copies of an object of the preceding job, and to impose the copies of the object onto a roll of print medium (Step S102). Successively, control unit 31 (judging section 39) determines the width of a blank area or areas and the length of a unprinted part of a printing area for printing the preceding job, both to be created by imposing copies of the object of the preceding job to be printed, onto the roll of print media (Step S103). Then, printing unit 36 (the print engine) starts printing of the preceding job and outputs copies of the object of the preceding job onto the roll of print medium (Step S104).

As illustrated in FIG. 6, for arranging copies of object 51*a* of the preceding job to be printed, at the center of roll of print media 50 (that is, creating blank areas at the both sides of a printing area for copies of object 51*a* so as to extend along the both edges of the print media 50), the width of each blank area is given by $WM=(WR-WOa)/2$; and for arranging copies of object 51*a* of the preceding job on one side of roll of print media 50 (that is, creating a blank area beside the printing area for copies of object 51*a* so as to extend along one edge of the print media), the width of the blank area is given by $WM=(WR-WOa)$, where WM is the width of the blank area. WR is the width of roll of print media 50 and WOa is the width of the printing area for printing copies of object 51*a* of the preceding job. The length of a unprinted part of a printing area for printing the preceding job is given by $LJa=LOa \times na$, where Lja is the length of the unprinted part of the printing area for printing the preceding job, LOa is the length (in the machine direction of the print media) of the printing area for printing a copy of object 51*a* of the preceding job and na is the number of copies (unprinted copies) of object 51*a* to be printed.

Receiving a succeeding job from client terminal 20 during printing of the preceding job (Step S105), control unit 31 of roll printing device 30 causes image processor 35 (the raster-image processor) to rasterize the succeeding job to create image data for printing copies of an object contained in the succeeding job, as needed (Step S106). Control unit 31 (judgment section 39) then determines the size of a printing area for printing a copy of an object contained in the succeeding job (a printing area for one object contained in the succeeding job) and the length of a printing area for printing the succeeding job (Step S107). As illustrated in FIG. 8, for arranging copies of an object of the succeeding job in a blank area created along one edge of the print media 50, the length of a printing area for printing the succeeding job is given by $LJb=LOb \times nb$; and for arranging copies of an object of the succeeding job in blank areas created along the both edges of the print media 50, the length of a printing area for printing the succeeding job is given by $LJb=LOb \times nb/2$, where Ljb is the length of the printing area for printing the succeeding job, LOb is the length (in the machine direction of the print media) of the printing area for printing a copy of object 51*b* of the preceding job and nb is the number of copies of object 51*b* to be printed. The determination of the width of the blank area or areas and the length of the unprinted part of the printing area for the preceding job in Step S103 may be performed after the control unit 31 received the succeeding job (for example, after Step S105 or Step S106).

In this connection, in a case where the size of the printing area for a copy of the object can be determined by parsing the succeeding job, control unit 31 may omit the rasterization in Step S106 and perform the rasterization of the succeeding job, for example, just after the judgment in Step S108. In the above calculations, it should be noted that the width of the printing area for an object or a copy of an object of a job (the preceding job or the succeeding job) and the length of the same do not necessarily match with the actual sizes of the object itself. This is because, in printing stickers with a roll printing device, there is a need to secure a sufficient width of matrix waste, which surrounds the stickers, being sufficient to remove the matrix waste in the post processing. In such printing, each of the width WOb and length LOb of the printing area for a copy of the object includes a part or the whole of the size of the matrix waste.

Next, control unit 31 (judging section 39) judges whether to print the succeeding job together with the preceding job (whether the blank area or areas have enough space to arrange copies of the object of the succeeding job to be printed) (Step S108). For example, when printing the succeeding job together with the preceding job with creating blank areas so as to extend along the both edges of the print media, arranging copies of the object of the succeeding job in each of the blank areas in a single line, and lining up the end of the unprinted part of the printing area for the preceding job and the end of the printing area for the succeeding job on the print media, control unit 31 (judging section 39) judges to print the succeeding job together with the preceding job under the condition that the following relationships hold: WM>WOb and Lja≥Ljb, where WM is the width of the blank area, WOb is the width of the printing area for printing a copy of the object of the succeeding job, Lja is the length of the unprinted part of the printing area for the preceding job, and Ljb is the length of the printing area for the succeeding job.

When judging not to print the succeeding job together with the preceding job (judging that the blank area or areas do not have enough space to arrange copies of the object of the succeeding job to be printed or printing of the preceding job is estimated to be finished earlier than the finish of printing of the succeeding job) (NO in Step S108), control unit 31 (combining section 40) finalizes the consecutive processing (END). On the other hand, when judging to print the succeeding job together with the preceding job (YES in Step S108), control unit 31 (combining section 40) combines the succeeding job together with the preceding job (defines the layout of copies of the object of the succeeding job to be printed, in the blank area or areas so as to line up the end of the unprinted part of the printing area for the preceding job and the end of the printing area for the succeeding job) (Step S109). There can be considered the following three methods to combine the preceding job and the succeeding job.

Figure 9:
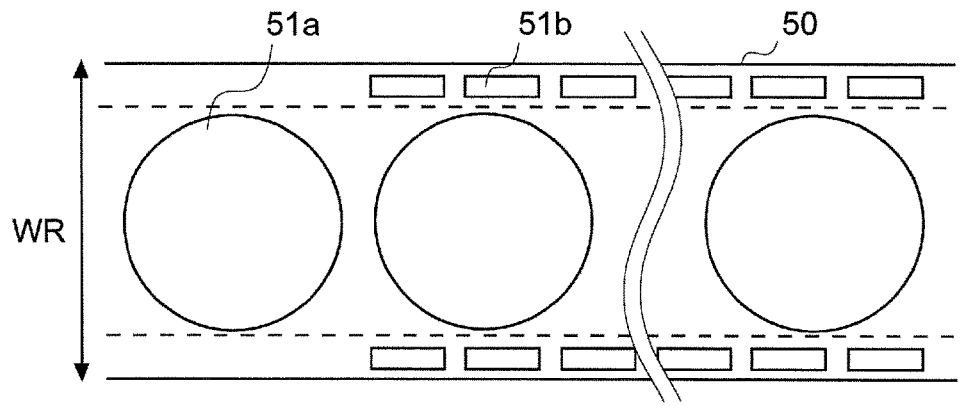
FIG. 9 is an explanatory schematic diagram for illustrating a first method to combine a preceding job and a succeeding job in accordance with Example 1.

FIG. 9 illustrates the first method to combine the preceding job and the succeeding job. In the first method, when defining the layout of copies of object 51b of the succeeding job in the blank area or areas, the control unit 31 arranges the copies of object 51b of the succeeding job at the minimum intervals in the blank area or areas, starting at the end position of the printing area for the preceding job (the end position of the last-printed copy of object 51a of the preceding job). This method results in the inequality of the intervals of the arranged copies of object 51b of the succeeding job and the intervals of the arranged copies of object 51a of the preceding job. Therefore, according to this method, the control unit 31 does not combine image data for printing copies of object 51a of the preceding job and image data for printing copies of object 51b of the succeeding job (that is, does not create combined image data from the image data for printing copies of object 51a of the preceding job and image data for printing copies of object 51b of the succeeding job, and sends print instructions based on the two pieces of image data to printing unit 36). Therefore, control unit 31 may rasterize the succeeding job at least after the judgment in Step S108 (for example, in combining the jobs in Step S109), and may omit the rasterization of the succeeding job in Step S106 for performing the judgment whether to combine the jobs to print the jobs together. It allows control unit 31 to perform the judgment swiftly. Even when control unit 31 has judged not to combine the jobs to print the jobs together, it prevents control unit 31 from performing a useless process to rasterize the succeeding job.

Figure 10:
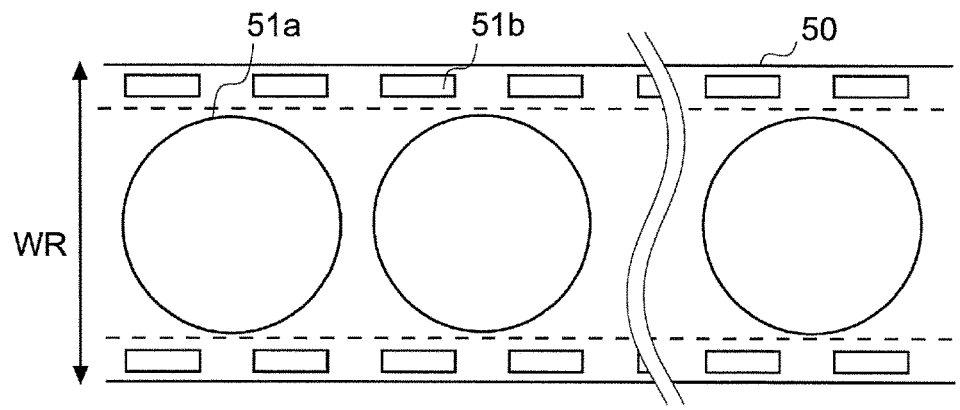
FIG. 10 is an explanatory schematic diagram for illustrating a second method to combine a preceding job and a succeeding job in accordance with Example 1.

FIG. 10 illustrates the second method to combine the preceding job and the succeeding job. In the second method, when defining the layout of copies of object 51b of the succeeding job in the blank area or areas, control unit 31 arranges the copies of object 51b of the succeeding job in the blank area or areas, with adjusting the intervals of the copies of object 51b of the succeeding job to the intervals of the copies of object 51a of the preceding job. With this method, control unit 31 can create combined image data from the image data for printing copies of object 51a of the preceding job and image data for printing copies of object 51b of the succeeding job, and send print instructions based on the combined image data to printing unit 36. It allows control unit 31 to control a process of printing easily. In post processing, a roll of print media 50 is cut to separate the blank area or areas, and then the blank area or areas are cut into pieces each including a copy or copies of object 51b of the succeeding job. Therefore, arranging copies of object 51b of the succeeding job at regular intervals, makes the post processing on the printed printing media easier. On the other hand, arranging copies of object 51b of the succeeding job at irregular intervals (for example, arranging copies of object 51b of the succeeding job in the blank areas at the both sides of the copies of object 51a of the preceding job, while increasing and decreasing the intervals of copies of object 51b), it makes possible to perform the post processing on the printed print media because the intervals of the copies of object 51b of the succeeding job changes periodically.

Figure 11:
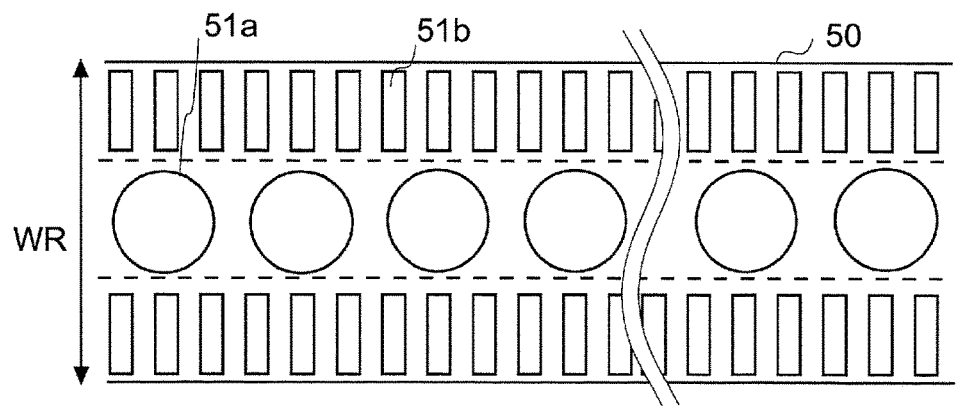
FIG. 11 is an explanatory schematic diagram for illustrating a third method to combine a preceding job and a succeeding job in accordance with Example 1.

In the third method, when defining the layout of copies of object 51b of the succeeding job in the blank area or areas, control unit 31 arranges the copies of object 51b of the succeeding job in the blank area or areas, with the copies being turned according to the size of the printing area for a copy of the object of the succeeding job and to the width of the blank area. For example, as illustrated in FIG. 11, under the condition that the width of each of the blank areas is greater than the size of the printing area for a copy of the object of the succeeding job in the longitudinal direction, control unit 31 arranges the copies of object 51b of the succeeding job in the blank areas, by turning the copies at 90 degrees so as to match the longitudinal direction of the copies of object with the width direction of the blank area. This method allows the efficient layout of the copies of object 51b of the succeeding job, and the succeeding job can be combined with the preceding job even if the printing area for the succeeding job is estimated to be long. This method further saves a use of the print media.

Returning to the flowchart illustrated in FIG. 5, control unit 31 (combining section 40) judges whether it is time to replace image data currently used for printing (to change the print processing from the printing of only the preceding job to printing of the preceding job and the succeeding job together) (Step S110). In concrete terms, control unit 31 (combining section 40) judges the time when the length of the current unprinted part of the printing area for the preceding job, which is LJa as obtained in Step S103, agrees with the length of the printing area for the succeeding job, which is LJb as obtained in Step S107, as the time to replace the image data currently used for printing.

When judging that the time to replace the image data for printing has arrived (YES in Step S110), control unit 31 (combining section 40) changes image data currently used for printing, from the image data created from the preceding job (the image data for printing only copies of the object of the preceding job) to both of the image data created from the preceding job (the image data for printing copies of the object of the preceding job) and the image data created from the succeeding job (the image data for printing copies of the object of the succeeding job) (Step S111). Printing unit 36 (print engine) uses the replaced image data to continue the printing (Step S112). Then, when the printing is finished, control unit 31 finalizes the consecutive processing flow (END).

As described in the foregoing, roll printing device 30 is configured to perform the following operations in response to receiving a succeeding job during printing of a preceding job. That is, roll printing device 30 judges whether the blank area or areas, determined on the basis of the printing area for copies of the object of the preceding job to be printed, have enough space to arrange copies of the object of the succeeding job to be printed, and whether the layout of the copies of the object of the succeeding job in the blank area or areas can be determined so as to line up the end of the unprinted part of the printing area for the preceding job and the end of the printing area for the preceding job. When judging that the blank area or areas have enough space and that the ends of the printing areas can be lined up, roll printing device 30 defines the layout of the copies of the object of the succeeding job in the blank area or areas, and at the time to replace the image data currently used for printing, changes image data currently used for printing, according to the layout, from the image data created from the preceding job (the image data for printing only copies of the object of the preceding job) to both of the image data created from the preceding job (the image data for printing copies of the object of the preceding job) and the image data created from the succeeding job (the image data for printing copies of the object of the succeeding job), to continue the printing based on the image data for printing, which has been changed. It allows roll printing device 30 to combine and print the preceding job and the succeeding job efficiently, and to finish the printing of the preceding job and the succeeding job with the end of the printing area for the preceding job and the end of the printing area for the preceding job being lined up.

Example 2

Figure 12:
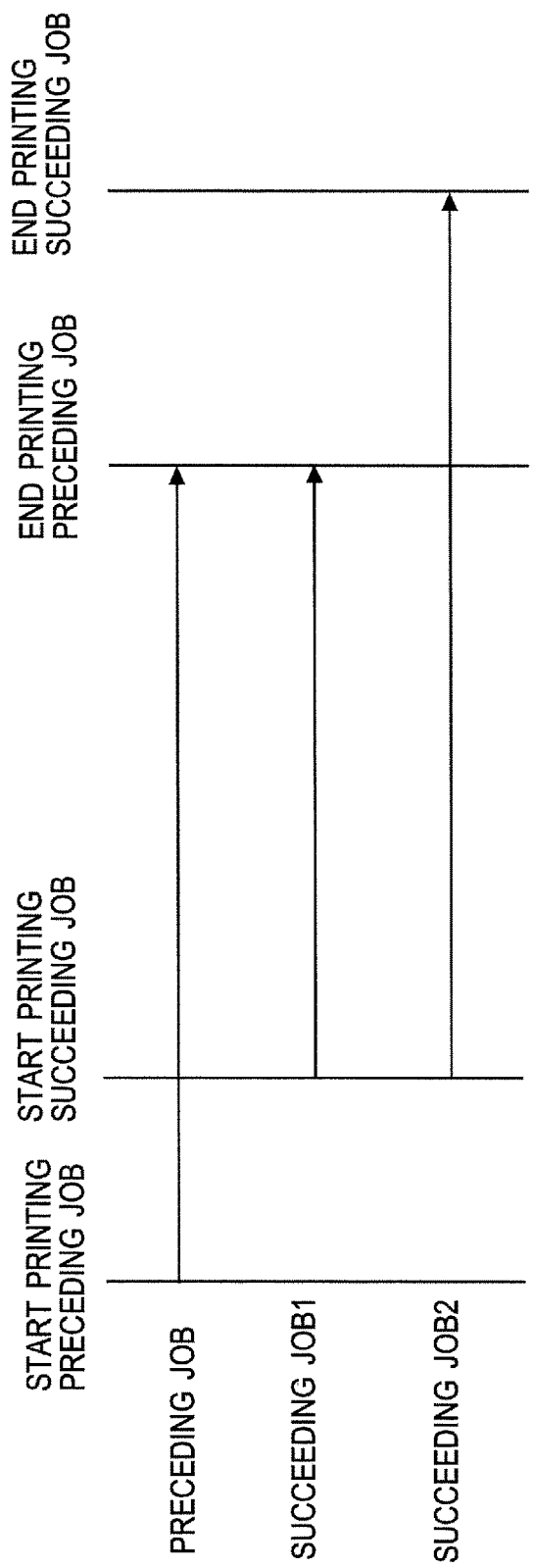
FIG. 12 is a timing chart illustrating the start time and finish time of print processing of jobs in accordance with Example 2.
Figure 13:
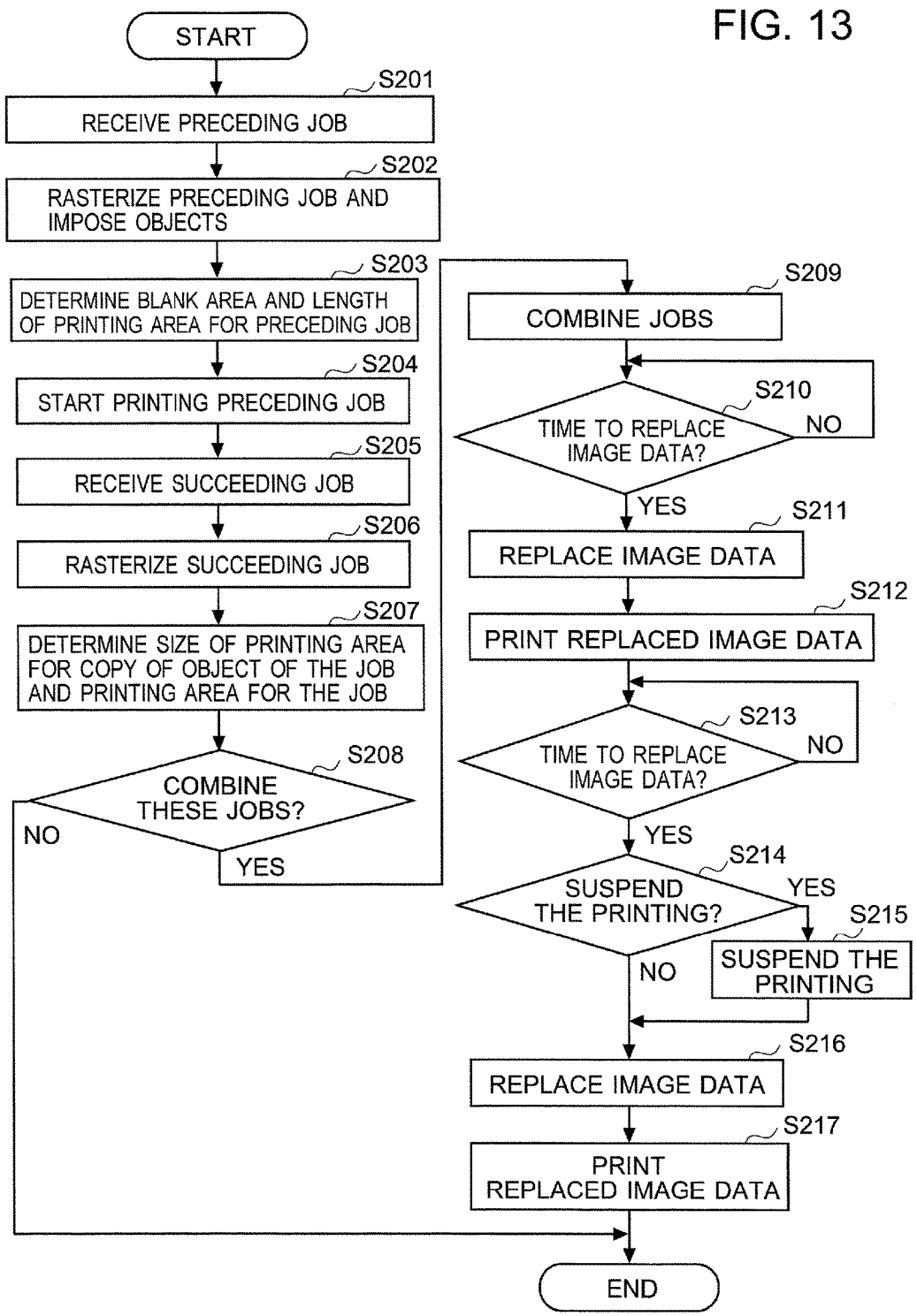
FIG. 13 is a flowchart illustrating a flow of the disclosed method for controlling printing on a roll of print media (operations of a roll printing device which has received a succeeding job during printing of a preceding job) in accordance with Example 2.
Figure 14:
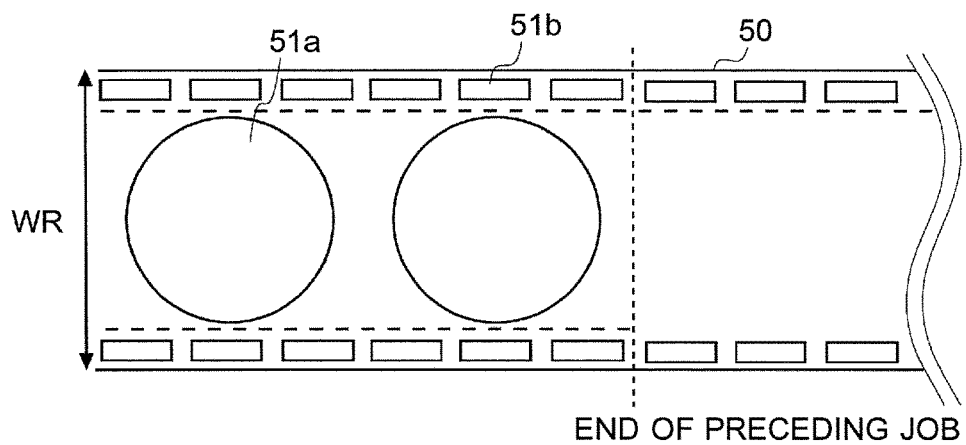
FIG. 14 is a schematic diagram for illustrating the control of printing on a roll of print media, in printing a succeeding job after a finish of printing a preceding job, by using the same object layout as that used in printing the succeeding job together with the preceding job, in accordance with one or more embodiments.
Figure 15:
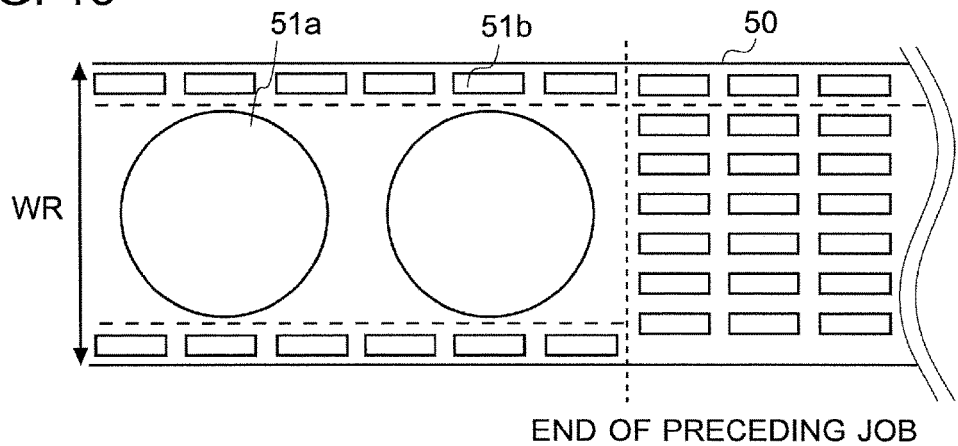
FIG. 15 is a schematic diagram for illustrating the control of printing on a roll of print media, in printing a succeeding job after a finish of printing a preceding job, by using a different object layout from that used in printing the succeeding job together with the preceding job, in accordance with one or more embodiments.

Next, a description is given of a roll printing device, a non-transitory recording medium storing a computer-readable program for controlling printing on a roll of print media, and a method for controlling printing on a roll of print media, each in accordance with Example 2, with reference to FIGS. 12 through 15. FIG. 12 is a timing chart illustrating the start time and finish time of print processing of jobs. FIG. 13 is a flowchart illustrating a flow of the disclosed method for controlling printing on a roll of print media in accordance with Example 2. FIG. 14 and FIG. 15 are schematic diagrams for illustrating the control of printing on a roll of print media, in printing a succeeding job after a finish of printing a preceding job, by using the same object layout as that used in printing the succeeding job together with the preceding job, and using a different object layout from that used in printing the succeeding job together with the preceding job, respectively.

In Example 1, a description was given of the roll printing device configured to, in the judgment whether to combine the succeeding job with the preceding job to print the jobs together in Step S108 in FIG. 5, judge to combine and print the jobs, when judging that the blank area or areas have enough space to arrange the copies of the object of the succeeding job to be printed, in the blank area or blank areas and that the length of the unprinted part of the printing area for the preceding job is not less than the length of the printing area for the succeeding job. With this judgment, as illustrated in FIG. 12, the roll printing device can finish printing of the succeeding job 1 and printing of the preceding job at the same time. On the other hand, if judging whether to combine and print the succeeding job with the preceding job in Step S108 in FIG. 5, without comparing the lengths of the printing areas for the jobs, the roll printing device may continue the printing of the succeeding job even after the finish of the printing of the preceding job under the condition that the length of the unprinted part of the printing area for the preceding job is less than the length of the printing area for the succeeding job, as can be seen from the preceding job and the succeeding job 2 in FIG. 12. In this case, the whole printing processing does not finish until the end of the printing of the succeeding job. Therefore, against the operator's demand to finish the processing of the preceding job in short time, the post processing of the preceding job will start after the finish of the printing of the succeeding job, which may delay the processing of the preceding job.

There can be considered a method to temporarily suspend the printing of the roll printing device at a time when the printing of the preceding job has been finished, and resume the printing of just the succeeding job, after cutting off the printed part of the print media. However, in this method, the roll printing device temporarily suspends the printing even when the printing of just the succeeding job is estimated to be finished a short time, which can delay the finish of the printing of the succeeding job. Therefore, the roll printing device may be configured to, on judging that the printing of the succeeding job is estimated to be finished in a short time after the time when the printing of the preceding job has been finished (a time period necessary to finish the printing of the succeeding job after the time when the printing of the preceding job has been finished is shorter than a predetermined time period), continue the printing until the finish of the printing of the succeeding job.

In the present example, the roll printing device is configured to perform the following operations. That is, the roll printing device uses the dropdown menu in the section 60C ("Printing of the succeeding job at the end of the preceding job (when "Alignment of print end positions" is OFF)") in the succeeding-job setup screen 60 in FIG. 4A, to prompt an operator to choose one of the options of "Suspend the printing" at the finish of printing of the preceding job, "Suspend (the printing at the finish of printing of the preceding job) if a certain period is needed before the end of the printing" and "Continue the printing" after the finish of printing of the preceding job as illustrated in FIG. 4D. Then, according to the option chosen by the operator, control unit 31 (combining section 40) defines the layout of copies of the object of the succeeding job in the blank area or areas, and determines the time to replace image data currently used for printing. When the length of the unprinted part of the printing area for the preceding job is less than the length of the printing area for the succeeding job, control unit 31 (combining section 40) determines the time to replace image data currently used for printing twice, because the print engine needs three types of image data for the printing: image data for printing only copies of an object of the preceding job, both of the image data for printing copies of an object of the preceding job and image data for printing copies of an object of the succeeding job (or combined image data of these two types of image data), and image data for printing only copies of an object of the succeeding job.

Referring to the flowchart indicated in FIG. 13 and the schematic diagrams illustrated in FIGS. 14 and 15, a description is given of the operations to be performed by the roll printing device 30 which has received a succeeding job during printing of a preceding job. CPU 31a reads out a program for controlling printing on a roll of print media, stored in ROM 31b or storage unit 32, loads the program onto RAM 31c, and executes the program, thereby performing steps of the flowcharts illustrated in FIG. 13. The following description is given under the assumption that, in succeeding-job setup screen 60, "ON" is set in section 60A ("Use of the settings") and "OFF" is set in section 60B ("Alignment of print end positions").

Similarly to the operations of Example 1, control unit 31 of roll printing device 30 receives a preceding job from client terminal 20 (Step S201), and according to instructions of control unit 31, image processor 35 (the raster-image processor) then rasterizes the received preceding job to create image data for printing copies of an object of the preceding job, and to impose the copies of the object onto a roll of print medium (Step S202). Successively, control unit 31 (judging section 39) determines the width of a blank area or areas and the length of a unprinted part of a printing area for printing the preceding job, both to be created onto the roll of print media by imposing copies of the object of the preceding job onto the print media (Step S203). Then, printing unit 36 (the print engine) starts printing of the preceding job and outputs copies of the object of the preceding job onto the roll of print medium (Step S204).

Receiving a succeeding job from client terminal 20 during printing of the preceding job (Step S205), control unit 31 of roll printing device 30 causes image processor 35 (the raster-image processor) to rasterize the succeeding job to create image data for printing copies of an object contained in the succeeding job, as needed (Step S206). Control unit 31 (judgment section 39) then determines the size of a printing area for printing a copy of an object contained in the succeeding job (a printing area for one object contained in the succeeding job) and the length of a printing area for printing the succeeding job (Step S207). Similarly to the operations of Example 1, the determination of the width of the blank area or areas and the length of the unprinted part of the printing area for the preceding job in Step S203 may be performed after the control unit 31 received the succeeding job (for example, after Step S205 or Step S206). In a case where the size of the printing area for a copy of the object can be determined by parsing the succeeding job, control unit 31 may omit the rasterization in Step S206 and perform the rasterization of the succeeding job, for example, just after the judgment in Step S208. In printing stickers with a roll printing device, each of the width WOb and length LOb of the printing area for a copy of the object includes a part or the whole of the size of the matrix waste.

Next, control unit 31 (judging section 39) judges whether to print the succeeding job together with the preceding job (whether the blank area or areas have enough space to arrange copies of an object of the succeeding job to be printed) (Step S208). Since there is no need to line up the end of the unprinted part of the printing area for the preceding job and the end of the printing area for the succeeding job on the print media in the printing of the present example, control unit 31 (judging section 39) judges to print the succeeding job together with the preceding job under the conditions that WM>WOb holds, where WM is the width of the blank area and WOb is the width of the printing area for printing a copy of the object of the succeeding job.

When judging not to print the succeeding job together with the preceding job (judging that the blank area or areas do not have enough space to arrange copies of the object of the succeeding job to be printed) (NO in Step S208), control unit 31 (combining section 40) finalizes the consecutive processing (END). On the other hand, when judging to print the succeeding job together with the preceding job (YES in Step S208), control unit 31 (combining section 40) combines the succeeding job together with the preceding job (defines the layout of copies of the object of the succeeding job in the blank area or areas) (Step S209). Similarly to the operations of Example 1, there can be considered the following three methods to combine the preceding job and the succeeding job: the first method to arrange the copies of object 51b of the succeeding job at the minimum intervals in the blank area or areas; the second method to arrange the copies of object 51b of the succeeding job in the blank area or areas, with adjusting the intervals of the copies of object 51b of the succeeding job to the intervals of the copies of object 51a of the preceding job; and the third method to arrange the copies of object 51b of the succeeding job in the blank area or areas, with the copies being turned according to the size of the printing area for a copy of the object of the succeeding job and the width of the blank area.

Next, control unit 31 (combining section 40) judges whether it is a first time to replace image data currently used for printing (to change the print processing from the printing of only the preceding job to printing of the preceding job and the succeeding job together) (Step S210). When judging that the time to replace the image data for printing has arrived (YES in Step S210), control unit 31 (combining section 40) changes image data currently used for printing, from the image data created from the preceding job (the image data for printing only copies of the object of the preceding job) to both of the image data created from the preceding job (the image data for printing copies of the object of the preceding job) and the image data created from the succeeding job (the image data for printing copies of the object of the succeeding job) (Step S211). Printing unit 36 (the print engine) uses the replaced image data to continue the printing (Step S212). Then, when the printing is finished, control unit 31 finalizes the consecutive processing flow (END).

Control unit 31 (combining section 40) then judges whether it is a second time to replace image data currently used for printing (under the condition that the length of the unprinted part of the printing area for the preceding job is less than the length of the printing area for the succeeding job, a time to change the print processing from the printing of the preceding job and the succeeding job together to printing of only the succeeding job, in other words, a time when the printing of the preceding job is finished) (Step S213). When judging that the second time to replace the image data for printing has arrived (YES in Step S213), control unit 31 (combining section 40) checks the settings for the printing of the succeeding job at the finish of printing of the preceding job (checks whether the option of "Suspend the printing" has been chosen in the dropdown menu in the section 60C in the succeeding-job setup screen 60) (Step S214). When the option has been chosen (YES in Step S210), control unit 31 (combining section 40) instructs printing unit 36 (the print engine) to suspend the printing. After that, control unit 31 (combining section 40) changes image data currently used for printing, from both of the image data created from the preceding job (the image data for printing copies of the object of the preceding job) and the image data created from the succeeding job (the image data for printing copies of the object of the succeeding job) to the image data created from the succeeding job (the image data for printing only copies of the object of the succeeding job) (Step S216). Printing unit 36 (print engine) uses the replaced image data to continue the printing (Step S217).

When changing the image data currently used for printing, to the image data created from the succeeding job (the image data for printing only copies of the object of the succeeding job) under the condition that the option of "Use the same layout" of the dropdown menu in the section 60D has been chosen in the succeeding-job setup screen 60, control unit 31 (combining section 40) defines the layout of copies of object 51b of the succeeding job such that the copies are arranged just in the blank area or areas, as illustrated in FIG. 14, and changes image data currently used for printing, on the basis of the defined layout. A use of the layout delays the time to finish the succeeding job in comparison with a use of the layout such that the copies are arranged across the whole area of the roll of print media 50 but makes the post processing (cutting the print media into pieces of the copies of object 51b) easier because the layout of the copies of object 51b of the succeeding job is the same as that used in printing the succeeding job together with the preceding job. Under the condition that the option of "Use a new layout" of the dropdown menu in the section 60D has been chosen in the succeeding-job setup screen 60, control unit 31 (combining section 40) defines the layout of copies of object 51b of the succeeding job such that the copies are arranged across the whole area of the roll of print media 50, as illustrated in FIG. 15, and changes image data currently used for printing, on the basis of the defined layout. A use of the layout needs to change the post processing (cutting the print media into pieces of the copies of object 51b) at the finish of printing of the preceding job, but makes the finish of printing of the succeeding job earlier and avoids wasting the roll of print media 50.

As described in the foregoing, roll printing device 30 of the present example is configured to perform the following operations in response to receiving a succeeding job during printing of a preceding job. That is, roll printing device 30 judges whether the blank area or areas, determined on the basis of the printing area for copies of the object of the preceding job, have enough space to arrange copies of the object of the succeeding job to be printed. When judging that the blank area or areas have enough space, roll printing device 30 defines the layout of the copies of the object of the succeeding job in the blank area or areas. Under the condition that the length of the unprinted part of the printing area for the preceding job is less than the length of the printing area for the succeeding job, roll printing device 30 changes image data currently used for printing twice. At the first time to replace the image data currently used for printing, roll printing device 30 uses the defined layout to change image data currently used for printing, from the image data created from the preceding job (the image data for printing only copies of the object of the preceding job) to both of the image data created from the preceding job (the image data for printing copies of the object of the preceding job) and the image data created from the succeeding job (the image data for printing copies of the object of the succeeding job), to continue the printing based on the image data for printing. At the second time to replace the image data currently used for printing (the time when the printing of the preceding job is finished), roll printing device 30 uses the layout defined according to the option chosen in the dropdown menu in the section 60D in the succeeding-job setup screen 60, to change image data currently used for printing, from both of the image data created from the preceding job (the image data for printing copies of the object of the preceding job) and the image data created from the succeeding job (the image data for printing copies of the object of the succeeding job) to the image data created from the succeeding job (the image data for printing only copies of the object of the succeeding job), to continue the printing based on the image data for printing. Such operations allow the roll printing device to combine and print the succeeding job with the preceding job efficiently.

Example 3

Figure 16:
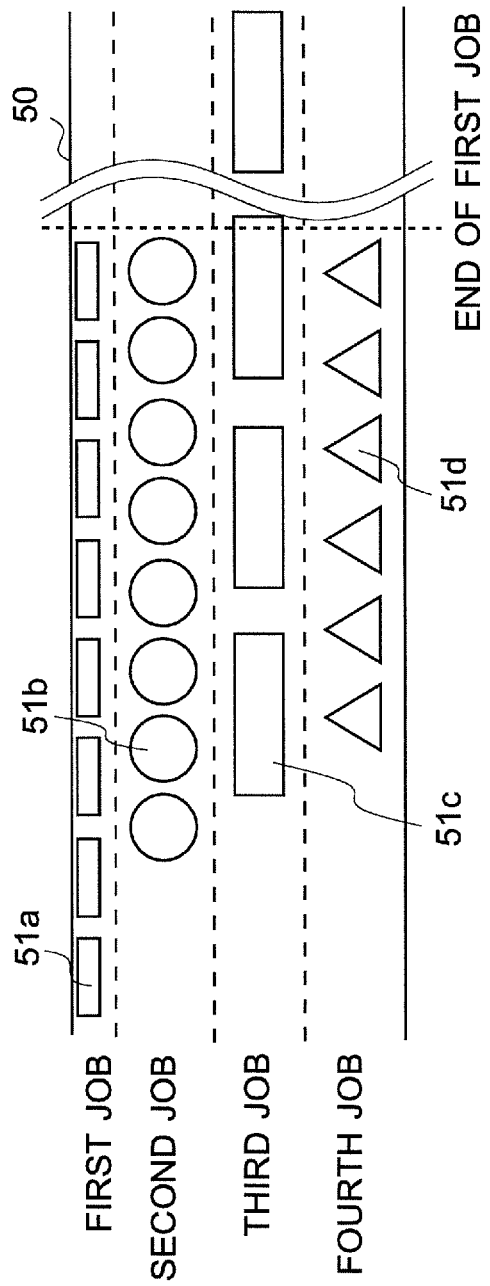
FIG. 16 is an explanatory schematic diagram for illustrating a way to combine a preceding job and a succeeding job (operations of a roll printing device which has received plural succeeding jobs during printing of a preceding job) in accordance with Example 3.

Next, a description is given of a roll printing device, a non-transitory recording medium storing a computer-readable program for controlling printing on a roll of print media, and a method for controlling printing on a roll of print media, each in accordance with Example 3, with reference to FIG. 16. FIG. 16 is an explanatory schematic diagram for illustrating a way to combine a preceding job and a succeeding job (operations of a roll printing device which has received plural succeeding jobs during processing of a preceding job).

In Examples 1 and 2, descriptions were given of operations of roll printing device 30 which has received one succeeding job during processing of a preceding job. However, roll printing device 30 can receive plural succeeding jobs during processing of a preceding job. In view of that, the roll printing device 30 may be configured to perform the following operations in response to receiving plural succeeding jobs during printing of a preceding job. That is, control unit 31 (judging section 39) may choose, from the received succeeding jobs, one or more jobs that are to be printed together with the preceding job with copies of the object contained in each of the one or more jobs to be printed, being arranged in the blank area or areas (in other words, one or more jobs such that the blank area or areas have enough space to arrange copies of the object or objects of the one or more job), where optionally, the end of the unprinted part of the printing area for the preceding job and the end of the printing area for each of the one or more jobs can be lined up (one or more jobs such that the length of the unprinted part of the printing area for the preceding job is not less than the length of the printing area for each of the one or more jobs). Control unit 31 (judging section 39) may define the layout of the copies of the object of each of the one or more jobs which have been chosen, in the blank area or areas, and at a time to replace the image data for printing, replace the image data currently used for printing, according to the defined layout, to continue the printing.

FIG. 16 shows an example of the layout of copies of object 51a of the first job, copies of object 51b of the second job, copies of object 51c of the third job and copies of object 51d of the fourth job, on a roll of print media 50. When roll printing device 30 has received the second to fourth job as succeeding jobs during printing copies of object 51a of the first job being the preceding job on a roll of print media, control unit 31 (judging section 39) chooses, among the second to fourth jobs, one or more jobs to be printed together with the first job with copies of the object contained in each of the one or more jobs being arranged in the blank areas on the print media and with the end of the unprinted part of the printing area for the preceding job and the end of the printing area for each of the one or more jobs being lined up on the print media (one or more jobs such that the blank areas have enough space to arrange copies of the object or objects of the one or more job and that the end of the unprinted part of the printing area for the preceding job and the end of the printing area for each of the one or more jobs can be lined up). In the example of FIG. 16, the blank areas on the print media determined on the basis of the printing area for printing the copies of object 51a of the first job, have enough space or width to arrange copies of the object contained in each of the second to fourth jobs. While the printing area for the third job is longer than the unprinted part of the printing area for the first job, the unprinted part of the printing area for the first job is longer than the printing area for each of the second job and the fourth job and copies of the objects of the second job and the fourth job can be printed with the ends of the printing areas for the second job and the fourth job being adjusted to the end of the printing areas for the first job. Therefore, control unit 31 (judging section 39) judges to combine and print the succeeding jobs other than the third job, in other words, the second job and the fourth job, together with the first job. Alternatively, control unit 31 may judge to combine and print all the succeeding jobs together with the first job, and print only the third job by using the method disclosed in Example 2, after finishing printing of the first, second and fourth job.

As described in the foregoing, by handing plural jobs to be combined and printed together with the preceding job, roll printing device 30 can process the jobs efficiently. Further, control unit 31 may omit rasterization of the succeeding jobs in Step S106 in FIG. 5 for Example 1 and Step S206 in FIG. 13 for Example 2, and obtain the size of a copy of an object of each job by analyzing each job. It allows control unit 31 to perform the judgment swiftly, and when judging not to combine the jobs, it prevents control unit 31 from performing a useless process to rasterize the succeeding jobs.

Example 4

Figure 17:
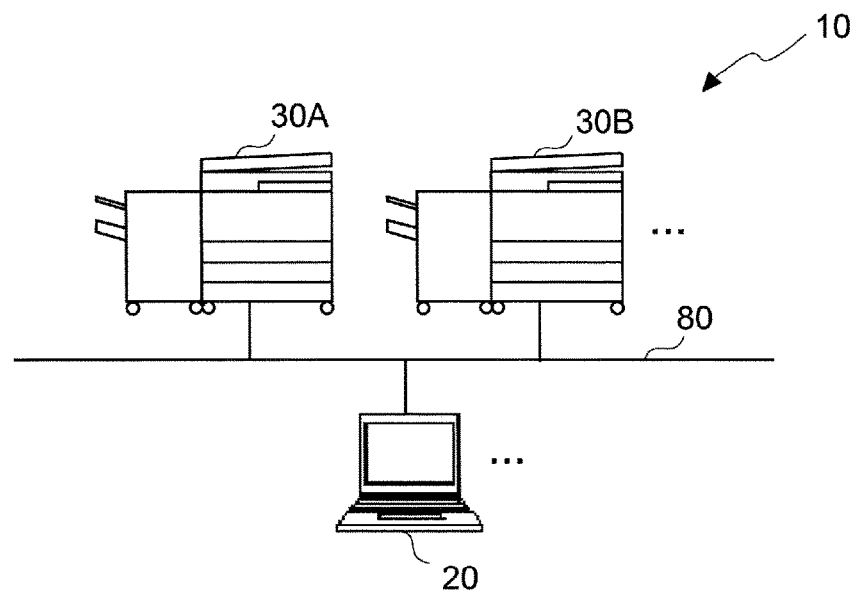
FIG. 17 is a schematic diagram illustrating a configuration of the disclosed printing system in accordance with Example 4.
Figure 18:
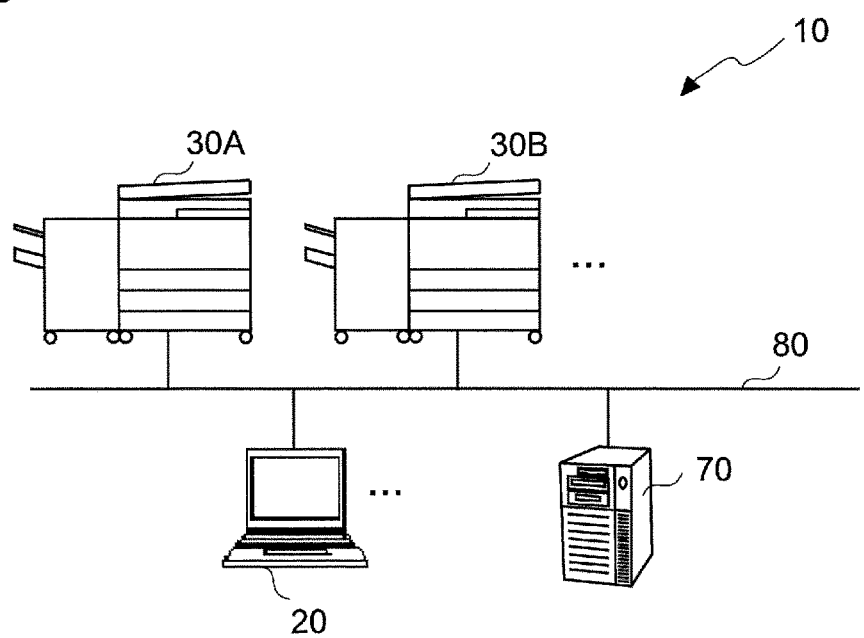
FIG. 18 is a schematic diagram illustrating another configuration of the disclosed printing system in accordance with Example 4.
Figure 19A:
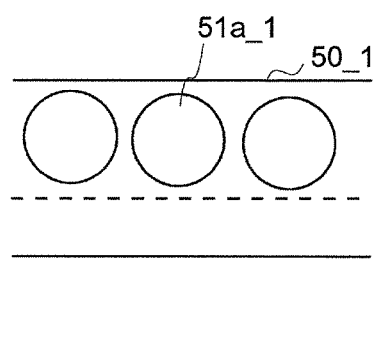
FIGS. 19A and 19B are explanatory schematic diagrams illustrating a way to choose one of roll printing devices in the printing system, in accordance with Example 4.
Figure 19B:
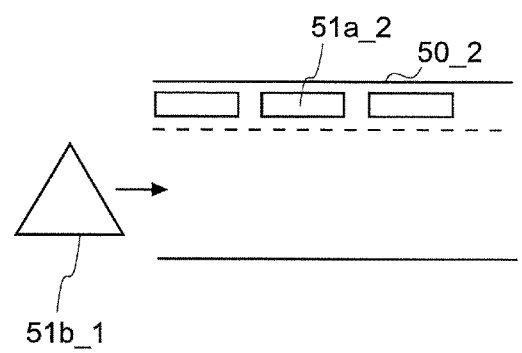

Next, a description is given of a roll printing device, a non-transitory recording medium storing a computer-readable program for controlling printing on a roll of print media, and a method for controlling printing on a roll of print media, each in accordance with Example 4, with reference to FIGS. 17 through 19B. Each of FIG. 17 and FIG. 18 is a schematic diagram illustrating a configuration of the disclosed printing system in accordance with Example 4. FIGS. 19A and 19B are explanatory schematic diagrams illustrating a way to select one of roll printing devices in the printing system.

In Examples 1 to 3, descriptions were given of operations of combining and printing jobs with one roll printing device. In printing system 10 including a plurality of roll printing devices 30 (please see 30A, 30B, etc. in FIG. 17 and FIG. 18) communicably connected to communication network 80 as illustrated in FIG. 17 and FIG. 18, the following operations of combining and printing jobs can be performed by one of the roll printing devices 30. In printing system 10, client terminal 20 or controller 70 can manage the plurality of roll printing devices 30 by grouping the roll printing devices 30, so as to use roll printing devices 30 in the same group for the operations of combining and printing jobs in the present example. In such printing system 10, when one of the roll printing devices 30 receives a succeeding job during the roll printing devices 30 printing a preceding job, the roll printing device 30 which received the succeeding job, controller 70 or client terminal 20 may perform the following operations. That is, the roll printing device 30 which received the succeeding job, controller 70 or client terminal 20 obtains information of a blank area or areas determined on the basis of a printing area for printing copies of an object contained in the preceding job currently processed by each of the roll printing device 30 which received the succeeding job and the other roll printing devices. Using the obtained information, the roll printing device 30 which received the succeeding job, controller 70 or client terminal 20 chooses one of the roll printing devices 30 to be used for printing the succeeding job together with the preceding job currently processed with copies of the object of the succeeding job being arranged in the blank area or areas (that is, chooses one roll printing device 30 which is processing a preceding job such that the blank area or areas determined on the basis of the printing area for copies of the object of the preceding job have enough space to place copies of an object of the succeeding job). After that, the roll printing device 30 which received the succeeding job, controller 70 or client terminal 20 instructs the roll printing device 30 which has be chosen, to define the layout of the copies of the object of the succeeding job in the blank area or areas, and according to the layout, change the image data currently used for printing at a certain time during the printing of the preceding job currently processed.

There is considered an example of printing operations of printing system 10 when receiving a succeeding job during printing of a preceding job with each of one roll printing device 30A and the other roll printing device 30B. FIGS. 19A and 19B illustrate print processing of roll printing device 30A and print processing of roll printing device 30B in the present example, respectively. As can be seen from these figures, the printing area for copies of object 51a_1 of the preceding job processed by roll printing device 30A is greater in size than the printing area for copies of object 51a_2 of the preceding job processed by roll printing device 30B. When roll printing device 30A receives a succeeding job, control unit 31 (judging section 39) of roll printing device 30A uses the printing area for copies of an object contained in the preceding job currently processed by the roll printing device 30A and the width of the print media 50_1 loaded on the roll printing device 30A, to determine the blank area or areas to be created on the print media 50_1. Control unit 31 (judging section 39) of roll printing device 30A then obtains, from roll printing device 30B, information of the blank area or areas to be created on the print media 50_2 loaded on the roll printing device 30B (the blank area or areas determined on the basis of a printing area for copies of an object contained in the preceding job currently processed and the width of the print media 50_2). Control unit 31 (judging section 39) of roll printing device 30A then compares each of the width of the blank area to be created on print media 50_1 and the width of the blank area to be created on print media 50_2 with the size of the printing area for a copy of the object 51b_1 of the succeeding job, to choose one of the roll printing devices 30A and 30B (in this example, roll printing device 30B) to be used for printing the succeeding job together with the preceding job currently processed with copies of the object 51b_1 of the succeeding job being arranged in the blank area to be created on the print media 50_1 or 50_2 (one of the roll printing devices 30A and 30B which is processing a preceding job that can be printed together with the succeeding job with copies of the object 51b_1 of the succeeding job being arranged in the blank area). Control unit 31 (judging section 39) of roll printing device 30A then instructs control unit 31 (combining section 40) of roll printing device 30B which has been chosen, to combine the succeeding job with the preceding job currently processed to print these jobs together. In this example, control unit 31 (judging section 39) of roll printing device 30A forwards the succeeding job to the roll printing device 30B which has been chosen and instructs the roll printing device 30B to define the layout of copies of the object of the succeeding job in the blank area or areas to be created on the print media loaded on the roll printing device 30B and change the image data currently used for printing, according to the layout, at a certain time during the printing of the preceding job currently processed by the roll printing device 30B.

Alternatively, controller 70 (or client terminal 20) obtains, from each of roll printing devices 30A and 30B, information of the blank area or areas to be created on of the print media 50_1 or 50_2 (the blank area or areas determined on the basis of a printing area for copies of an object contained in the preceding job currently processed and the width of the print media 50_1 or 50_2). Controller 70 (or client terminal 20) then compares the width of each of the blank area or areas to be created on print media 50_1 and the width of each of the blank area or areas to be created on print media 50_2 with the size of the printing area for a copy of the object 51b_1 of the succeeding job, to choose one of the roll printing devices 30A and 30B (in this example, roll printing device 30B) to be used for printing the succeeding job together with the preceding job currently processed with copies of the object 51b_1 of the succeeding job being arranged in the blank area or areas to be created on print media 50_1 or 50_2. Controller 70 (or client terminal 20) then instructs control unit 31 (combining section 40) of roll printing device 30B which has been chosen, to combine the succeeding job with the preceding job currently processed, to print these jobs together. In this example, controller 70 (or client terminal 20) sends the succeeding job to the roll printing device 30B which has been chosen and instructs the roll printing device 30B to define the layout of copies of the object of the succeeding job in the blank area or areas to be created on print media 50_2, and according to the layout, change the image data currently used for printing at a certain time during the printing of the preceding job currently processed by the roll printing device 30B.

As described in the foregoing, a use of a process of choosing one roll printing device 30 which can combine and print a succeeding job together with the preceding job currently processed, among plural roll printing devices 30 controlled as one group by client terminal 20 or controller 70 in printing system 10, allows the printing system 10 to combine and print a succeeding job containing any size of an object together with a preceding job, and allows printing system 10 to process the jobs efficiently.

The present invention should not be limited to the descriptions in the above-mentioned examples, and the constitution and control of the system and each apparatus may be modified appropriately unless the modification deviates from the intention of the present invention.

For example, in the above-mentioned examples, the descriptions were given to the case where roll printing device 30 handles print jobs (a preceding job and a succeeding job) received from client terminal 20. Alternatively, the disclosed control of printing on a roll of print media is applicable to processing of any of print jobs stored in a print sever or the like, print jobs obtained through a recording medium, such as a USB (universal serial bus) memory, print jobs stored in storage unit 32 of roll printing device 30, and other print jobs.

The present invention is applicable to roll printing devices configured to combine a preceding job and a succeeding job with each other to print these jobs together on a roll of print media, computer-readable programs for controlling printing on a roll of print media, to be executed in the roll printing device, non-transitory recording media each storing the computer-readable program, and methods for controlling combining a preceding job and a succeeding job with each other to print these jobs together on a roll of print media.

Although various embodiments of the present invention have been described and illustrated in detail, the disclosed embodiments are made for purposes of illustration and example only and not limitation. The scope of the present invention should be interpreted by terms of the appended claims.

What is claimed is:

1. A roll printing device for printing a job on a roll of print media, comprising:
   a raster-image processor that creates image data for printing copies of an object contained in a job to be printed;
   a hardware processor that:
      in response to receiving a succeeding job during printing of a preceding job by using the image data created from the preceding job, executes a judgment process including:
         using a printing area for copies of an object contained in the preceding job to be printed and a width of the print media, to determine a blank area or areas to be created on the print media, in which none of the copies of the object of the preceding job is printed, extending along one or both of edges of the print media facing each other in a width direction of the print media, and
         using a width of each of the blank area or areas and a size of a printing area in the width direction for a copy of an object contained in the succeeding job, to make a judgment whether to print the succeeding job together with the preceding job with copies of the object of the succeeding job to be printed, being arranged in the blank area or areas, and
      on judging to print the succeeding job together with the preceding job, defines a layout of the copies of the object of the succeeding job to be printed, in the blank area or areas, and according to the layout, changes image data currently used for printing, from the image data created from the preceding job to the image data created from the preceding job and the image data created from the succeeding job, at a certain time during the printing of the preceding job; and
   a print engine that uses the image data for printing, to print copies of an object or objects in the image data for printing, on the print media.

2. The roll printing device of claim 1, wherein in the judgment process, the hardware processor:
uses a length of a printing area for a copy of the object of the preceding job in a machine direction of the print media and a number of the copies of the object of the preceding job to be printed, to calculate a length of a unprinted part of a printing area for the preceding job,
uses a length of a printing area for a copy of the object of the succeeding job in the machine direction and a number of the copies of the object of the succeeding job to be printed, to calculate a length of a printing area for the succeeding job, and
further makes the judgment by using a result of comparison between the length of the unprinted part of the printing area for the preceding job and the length of the printing area for the succeeding job.

3. The roll printing device of claim 2, wherein on making a judgment that the length of the unprinted part of the printing area for the preceding job is not less than the length of the printing area for the succeeding job, the hardware processor:
defines the layout of the copies of the object of the succeeding job to be printed, in the blank area or areas so as to line up an end of the unprinted part of the printing area for the preceding job and an end of the printing area for the succeeding job, and
according to the layout, changes the image data currently used for printing, from the image data created from the preceding job to the image data created from the preceding job and the image data created from the successively job, at a time when a length of a current unprinted part of the printing area for the preceding job agrees with the length of the printing area for the succeeding job, during the printing of the preceding job.

4. The roll printing device of claim 2, wherein on making a judgment that the length of the unprinted part of the printing area for the preceding job is less than the length of the printing area for the succeeding job, the hardware processor:
changes the image data currently used for printing, from the image data created from the preceding job to the image data created from the preceding job and the image data created from the successively job, at a first time during the printing of the preceding job, and then
changes the image data currently used for printing, from the image data created from the preceding job and the image data created from the successively job to the image data created from the succeeding job, at a second time when the printing of the preceding job is finished.

5. The roll printing device of claim 4, wherein the hardware processor instructs the print engine to suspend printing at the second time.

6. The roll printing device of claim 4, wherein on judging that a time period necessary to finish the printing of the succeeding job after the second time is shorter than a predetermined time period, the hardware processor instructs the print engine to stop printing after the printing of the succeeding job is finished.

7. The roll printing device of claim 1, wherein in response to receiving a plurality of succeeding jobs during the printing of the preceding job, the hardware processor:
in the judging process, chooses, from the plurality of succeeding jobs, one or more jobs to be printed together with the preceding job with copies of the object contained in each of the one or more jobs to be printed, being arranged in the blank area or areas, and
in defining the layout, defines a layout of the copies of the object of each of the one or more jobs to be printed, in the blank area or areas.

8. The roll printing device of claim 1, wherein the roll printing device is communicably connected with a second roll printing device, and wherein the hardware processor of the roll printing device, in response to receiving a succeeding job during printing of a preceding job by using the image data created from the preceding job, executes a judgment process including:
using the printing area for the copies of the object of the preceding job currently processed by the roll printing device and the width of the print media loaded on the roll printing device, to determine the blank area or areas to be created on the print media loaded on the roll printing device,
obtaining, from the second roll printing device, information of a blank area or areas to be created on the print media loaded on the second roll printing device, determined on a basis of a printing area for copies of an object contained in the preceding job currently processed by the second roll printing device and a width of the print media loaded on the second roll printing device,
comparing a width of each of the blank area or areas to be created on the printed area loaded on the roll printing device and each of the blank area or areas to be created on the printed area loaded on the second roll printing device, with the size of the printing area for a copy of the object contained in the succeeding job in the width direction, to choose one of the roll printing device and the second roll printing device to be used for printing the succeeding job together with the preceding job currently processed with the copies of the object of the succeeding job to be printed, being arranged in the blank area or areas to be created on the printed area loaded on the one of the roll printing device and the second roll printing device, and
instructing the hardware processor of the one of the roll printing device and the second roll printing device, to define a layout of the copies of the object of the succeeding job to be printed, in the blank area or areas, and according to the layout, change the image data currently used for printing, at a certain time during the printing of the preceding job currently processed by the one of the roll printing device and the second roll printing device.

9. A non-transitory recording medium storing a computer-readable program for controlling printing on a roll of print media, to be executed in a roll printing device for printing a job on a roll of print media, the program comprising instructions which, when executed by a hardware processor of the roll printing device, cause the roll printing device to execute operations comprising:
causing a raster-image processor of the roll printing device to create image data for printing copies of an object contained in a preceding job to be printed;
causing a print engine of the roll printing device to print the copies of the object of the preceding job on the print media, by using the image data created from the preceding job;
in response to receiving a succeeding job during printing of the preceding job, causing the raster-image processor to create image data for printing copies of an object contained in the succeeding job to be printed, and executing a judgment process including:

using a printing area for the copies of an object contained in the preceding job to be printed and a width of the print media, to determine a blank area or areas to be created on the print media, in which none of the copies of the object of the preceding job is printed, extending along one or both of edges of the print media facing each other in a width direction of the print media, and using a width of each of the blank area or areas and a size of a printing area in the width direction for a copy of an object contained in the succeeding job, to make a judgment whether to print the succeeding job together with the preceding job with the copies of the object of the succeeding job to be printed, being arranged in the blank area or areas;

on judging to print the succeeding job together with the preceding job, defining a layout of the copies of the object of the succeeding job to be printed, in the blank area or areas, and according to the layout, changing image data currently used for printing, from the image data created from the preceding job to the image data created from the preceding job and the image data created from the succeeding job, at a certain time during the printing of the preceding job; and causing the print engine to print the copies of the object of the preceding job and the copies of the object of the succeeding job on the print media, by using the image data for printing, which has been changed.

10. The non-transitory recording medium of claim 9, wherein the judgment process further includes:

using a length of a printing area for a copy of the object of the preceding job in a machine direction of the print media and a number of the copies of the object of the preceding job to be printed, to calculate a length of a unprinted part of a printing area for the preceding job, using a length of a printing area for a copy of the object of the succeeding job in the machine direction and a number of the copies of the object of the succeeding job to be printed, to calculate a length of a printing area for the succeeding job, and further making the judgment by using a result of comparison between the length of the unprinted part of the printing area for the preceding job and the length of the printing area for the succeeding job.

11. The non-transitory recording medium of claim 10, wherein on making a judgment that the length of the unprinted part of the printing area for the preceding job is not less than the length of the printing area for the succeeding job, the defining the layout includes defining the layout of the copies of the object of the succeeding job to be printed, in the blank area or areas so as to line up an end of the unprinted part of the printing area for the preceding job and an end of the printing area for the succeeding job, and the changing the image data currently used for printing includes, according to the layout, changing the image data currently used for printing, from the image data created from the preceding job to the image data created from the preceding job and the image data created from the successively job, at a time when a length of a current unprinted part of the printing area for the preceding job agrees with the length of the printing area for the succeeding job, during the printing of the preceding job.

12. The non-transitory recording medium of claim 10, wherein on making a judgment that the length of the unprinted part of the printing area for the preceding job is less than the length of the printing area for the succeeding job, the changing the image data currently used for printing, includes:

changing the image data currently used for printing, from the image data created from the preceding job to the image data created from the preceding job and the image data created from the successively job, at a first time during the printing of the preceding job, and then changing the image data currently used for printing, from the image data created from the preceding job and the image data created from the successively job to the image data created from the succeeding job, at a second time when the printing of the preceding job is finished.

13. The non-transitory recording medium of claim 12, wherein the operations further comprise instructing the print engine to suspend printing at the second time.

14. The non-transitory recording medium of claim 12, wherein the operations further comprise, on judging that a time period necessary to finish the printing of the succeeding job after the second time is shorter than a predetermined time period, instructing the print engine to stop printing after the printing of the succeeding job is finished.

15. The non-transitory recording medium of claim 9, wherein in response to receiving a plurality of succeeding jobs during the printing of the preceding job, the judging process includes:

choosing, from the plurality of succeeding jobs, one or more jobs to be printed together with the preceding job with copies of the object contained in each of the one or more jobs to be printed, being arranged in the blank area or areas, and the defining the layout includes defining a layout of the copies of the object of each of the one or more jobs to be printed, in the blank area or areas.

16. A method for controlling printing on a roll of print media in a printing system including a roll printing device for printing a job on a roll of print media, the method comprising:

causing a raster-image processor of the roll printing device to create image data for printing copies of an object contained a preceding job to be printed;

causing a print engine of the roll printing device to print the copies of the object of the preceding job on the print media, by using the image data created from the preceding job;

in response to receiving a succeeding job during printing of the preceding job, causing the raster-image processor to create image data for printing copies of an object contained in the succeeding job to be printed, and executing a judgment process by a hardware processor of the roll printing device, the judgment process including:

using a printing area for the copies of an object contained in the preceding job to be printed and a width of the print media, to determine a blank area or areas to be created on the print media, in which none of the copies of the object of the preceding job is printed, extending along one or both of edges of the print media facing each other in a width direction of the print media, and using a width of each of the blank area or areas and a size of a printing area in the width direction for a copy of an object contained in the succeeding job, to make a judgment whether to print the succeeding job together with the preceding job with the copies of the object of the succeeding job to be printed, being arranged in the blank area or areas;

on judging to print the succeeding job together with the preceding job, defining by the hardware processor a layout of the copies of the object of the succeeding job to be printed, in the blank area or areas, and according to the layout, changing by the hardware processor image data currently used for printing, from the image data created from the preceding job to the image data created from the preceding job and the image data created from the succeeding job, at a certain time during the printing of the preceding job; and causing the print engine to print the copies of the object of the preceding job and the copies of the object of the succeeding job on the print media, by using the image data for printing, which has been changed.

17. The method of claim 16, wherein the judgment process further includes:

using a length of a printing area for a copy of the object of the preceding job in a machine direction of the print media and a number of the copies of the object of the preceding job to be printed, to calculate a length of a unprinted part of a printing area for the preceding job, using a length of a printing area for a copy of the object of the succeeding job in the machine direction and a number of the copies of the object of the succeeding job to be printed, to calculate a length of a printing area for the succeeding job, and further making the judgment by using a result of comparison between the length of the unprinted part of the printing area for the preceding job and the length of the printing area for the succeeding job.

18. The method of claim 17, wherein on making a judgment that the length of the unprinted part of the printing area for the preceding job is not less than the length of the printing area for the succeeding job, the defining the layout includes defining the layout of the copies of the object of the succeeding job to be printed, in the blank area or areas so as to line up an end of the unprinted part of the printing area for the preceding job and an end of the printing area for the succeeding job, and the changing the image data currently used for printing includes, according to the layout, changing the image data currently used for printing, from the image data created from the preceding job to the image data created from the preceding job and the image data created from the successively job, at a time when a length of a current unprinted part of the printing area for the preceding job agrees with the length of the printing area for the succeeding job, during the printing of the preceding job.

19. The method of claim 17, wherein on making a judgment that the length of the unprinted part of the printing area for the preceding job is less than the length of the printing area for the succeeding job, the changing the image data currently used for printing, includes:

changing the image data currently used for printing, from the image data created from the preceding job to the image data created from the preceding job and the image data created from the successively job, at a first time during the printing of the preceding job, and then changing the image data currently used for printing, from the image data created from the preceding job and the image data created from the successively job to the image data created from the succeeding job, at a second time when the printing of the preceding job is finished.

20. The method of claim 19, wherein the method further comprises instructing the print engine to suspend printing at the second time.

21. The method of claim 19, wherein the method further comprises, on judging that a time period necessary to finish the printing of the succeeding job after the second time is shorter than a predetermined time period, instructing the print engine to stop printing after the printing of the succeeding job is finished.

22. The method of claim 16, wherein in response to receiving a plurality of succeeding jobs during the printing of the preceding job, the judging process includes:

choosing, from the plurality of succeeding jobs, one or more jobs to be printed together with the preceding job with copies of the object contained in each of the one or more jobs to be printed, being arranged in the blank area or areas, and the defining the layout includes defining a layout of the copies of the object of each of the one or more jobs to be printed, in the blank area or areas.

23. The method of claim 16, wherein the printing system further includes a second roll printing device communicably connected with the roll printing device, and wherein the judgment process of the roll printing device includes, in response to the roll printing device receiving a succeeding job during printing of a preceding job by using the image data created from the preceding job, using the printing area for the copies of the object of the preceding job currently processed by the roll printing device and the width of the print media loaded on the roll printing device, to determine the blank area or areas to be created on the print media loaded on the roll printing device, obtaining, from the second roll printing device, information of a blank area or areas to be created on the print media loaded on the second roll printing device, determined on a basis of a printing area for copies of an object contained in the preceding job currently processed by the second roll printing device and a width of the print media loaded on the second roll printing device, comparing a width of each of the blank area or areas to be created on the printed area loaded on the roll printing device and each of the blank area or areas to be created on the printed area loaded on the second roll printing device, with the size of the printing area for a copy of the object contained in the succeeding job in the width direction, to choose one of the roll printing device and the second roll printing device to be used for printing the succeeding job together with the preceding job currently processed with the copies of the object of the succeeding job to be printed, being arranged in the blank area or areas to be created on the printed area loaded on the one of the roll printing device and the second roll printing device, and instructing the one of the roll printing device and the second roll printing device, to define a layout of the copies of the object of the succeeding job to be printed, in the blank area or areas, and according to the layout, change the image data currently used for printing, at a certain time during the printing of the preceding job currently processed by the one of the roll printing device and the second roll printing device.

* * * * *